US011094037B2

(12) United States Patent
Kawaguchi et al.

(10) Patent No.: US 11,094,037 B2
(45) Date of Patent: Aug. 17, 2021

(54) SEMICONDUCTOR DEVICE, IMAGE PROCESSING SYSTEM, IMAGE PROCESSING METHOD AND COMPUTER READABLE STORAGE MEDIUM

(71) Applicant: RENESAS ELECTRONICS CORPORATION, Tokyo (JP)

(72) Inventors: Hirofumi Kawaguchi, Tokyo (JP); Akihide Takahashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 105 days.

(21) Appl. No.: 16/673,466

(22) Filed: Nov. 4, 2019

(65) Prior Publication Data

US 2020/0202488 A1 Jun. 25, 2020

(30) Foreign Application Priority Data

Dec. 21, 2018 (JP) .............................. JP2018-239592

(51) Int. Cl.
*G06T 3/20* (2006.01)
*G06T 7/80* (2017.01)
(Continued)

(52) U.S. Cl.
CPC ................ *G06T 3/20* (2013.01); *B60R 1/002* (2013.01); *G06T 7/70* (2017.01); *G06T 7/80* (2017.01);
(Continued)

(58) Field of Classification Search
CPC .... G06T 3/20; G06T 7/80; G06T 7/70; G06T 11/001; G06T 2207/20212
See application file for complete search history.

(56) References Cited

U.S. PATENT DOCUMENTS

2003/0234866 A1 12/2003 Cutler
2015/0138312 A1 5/2015 Liu et al.
(Continued)

FOREIGN PATENT DOCUMENTS

JP 2008-079248 A 4/2008
JP 2010-283718 A 12/2010

OTHER PUBLICATIONS

Extended European Search Report issued in corresponding European Patent Application No. 19211237.3-1210, dated May 6, 2020.

*Primary Examiner* — David T Welch
(74) *Attorney, Agent, or Firm* — McDermott Will & Emery LLP

(57) ABSTRACT

A semiconductor device includes an image data acquisition circuit which acquires a plurality of first captured image data and a plurality of second captured image data at a first time and a second time, an adjustment region determination circuit which detects a target object from the plurality of first captured image data, and determines an adjustment region by estimating a position of the target object at the second time, a color adjustment circuit configured to determine a color adjustment gain based on the adjustment region, and perform color balance adjustment processing on the plurality of second captured image data based on the color adjustment gain, and an image synthesis circuit configured to synthesize the plurality of second captured image data so that overlapping regions included in a plurality of images of the plurality of second captured image data overlap each other.

20 Claims, 24 Drawing Sheets

(51) Int. Cl.
*G06T 7/70* (2017.01)
*G06T 11/00* (2006.01)
*B60R 1/00* (2006.01)

(52) U.S. Cl.
CPC ....... *G06T 11/001* (2013.01); *B60R 2300/102* (2013.01); *B60R 2300/105* (2013.01); *B60R 2300/303* (2013.01); *G06T 2207/20212* (2013.01); *G06T 2207/30252* (2013.01)

(56) References Cited

U.S. PATENT DOCUMENTS

| | | | |
|---|---|---|---|
| 2015/0243043 A1* | 8/2015 | Guan | G06K 9/00805 |
| | | | 701/1 |
| 2020/0020117 A1* | 1/2020 | Daehler | G06T 7/10 |
| 2020/0160070 A1* | 5/2020 | Sholingar | G06N 3/084 |

* cited by examiner t = N+2

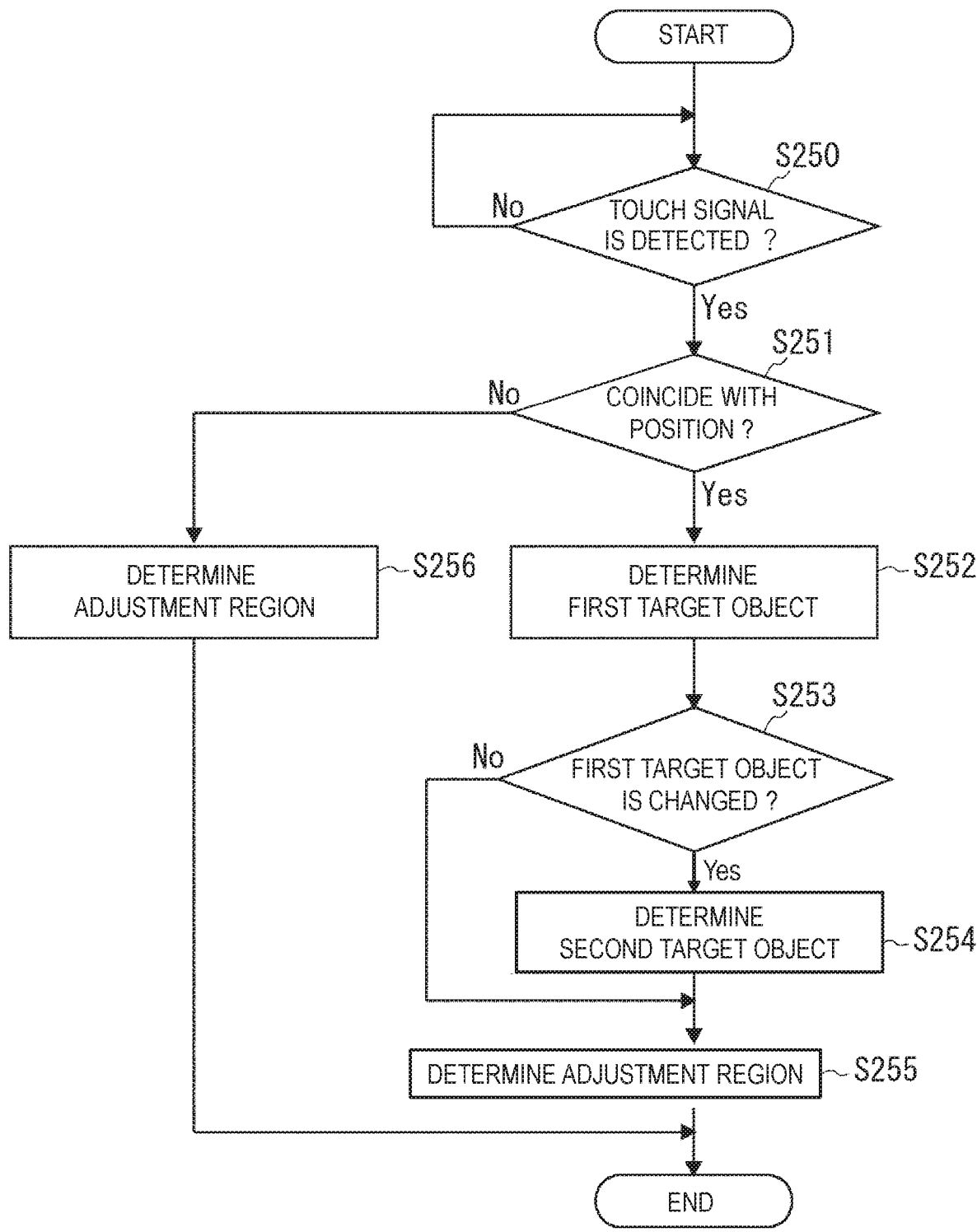

SEMICONDUCTOR DEVICE, IMAGE PROCESSING SYSTEM, IMAGE PROCESSING METHOD AND COMPUTER READABLE STORAGE MEDIUM

CROSS-REFERENCE TO RELATED APPLICATIONS

The disclosure of Japanese Patent Application No. 2018-239592 filed on Dec. 21, 2018 including the specification, drawings and abstract is incorporated herein by reference in its entirety.

BACKGROUND

The present disclosure relates to a semiconductor device, an image processing method, and a computer readable storage medium.

Image processing techniques for simultaneously capturing images of a single scene by a plurality of cameras and displaying the captured images by performing synthesis or geometric transformation have become widespread. In automobiles, a system that allows a driver to easily recognize the periphery of an automobile by using such a technique is becoming widespread. An example of such an image processing technique is a surround view system. The surround view system displays, for example, a surround view that is a two-dimensional image of a 360-degree scenery around an automobile operated by a driver as seen from directly above. Viewing the surround view allows the driver to intuitively recognize objects present around the automobile. Therefore, the surround view system is rapidly spreading as a technology contributing to improving safety of automobiles.

Incidentally, in the case where a plurality of cameras simultaneously captures images of a surrounding scene, a color of illumination may be different for each image capturing region of the image captured by the camera. Further, each camera has a function of performing color balance processing on the captured image. That is, each camera may process the captured image using color balance different from that of another camera. Therefore, when the images captured by the plurality of cameras are synthesized, there is a demand for a technique for synthesizing the plurality of images subjected to different color balance processing without a sense of discomfort.

For example, a synthesis video display device in Japanese unexamined Patent Application publication No. 2008-079248 calculates a first statistical value and a second statistical value by taking statistics of pixel values of photographed pixels overlapping in the synthesized video, and calculates a target gain obtained by dividing an average value of the first statistical value and the second statistical value by the first statistical value. Then, the synthesis video display device changes, from 1 to the target gain, an adjustment gain used for image adjustment processing performed from a photographed pixel corresponding to an optical axis of a photographing device that has photographed a video which is a target of image adjustment to the overlapping photographed pixel.

SUMMARY

However, in the art described in Japanese unexamined Patent Application publication No. 2008-079248, color balance processing is performed on the basis of the photographed pixel corresponding to the optical axis of the photographing device. For this reason, the art described in Japanese unexamined Patent Application publication No. 2008-079248 may not perform appropriate color balance processing as a distance from the optical axis of the photographing device increases. Therefore, for example, when an object to be noticed by a driver is relatively moving around an automobile, the art described in Japanese unexamined Patent Application publication No. 2008-079248 cannot dynamically perform color balance processing suitable for an image of the object.

Other objects and new features will be apparent from the description of this specification and the accompanying drawings.

A semiconductor device according to one embodiment includes an image data acquisition circuit which acquires, at a first time and a second time that is a time after the first time respectively, a plurality of captured image data obtained by capturing a plurality of images. The plurality of captured image data obtained at the first time is a plurality of first captured image data. The plurality of captured image data obtained at the second time is a plurality of second captured image data. Each image includes an overlapping region in an image capturing region of the own image. The overlapping region is a region where the image capturing regions of the images overlap each other. The semiconductor device further includes an adjustment region determination circuit which detects, from the plurality of first captured image data, a target object that is an object set to be recognized in advance, and determines an adjustment region by estimating a position of the target object at the second time based on a change in a position of the target object from a time before the first time to the first time, a color adjustment circuit which determines a color adjustment gain based on the adjustment region of the plurality of first capturing image data, and performs color balance adjustment processing on the plurality of second captured image data based on the color adjustment gain, and an image synthesis circuit which synthesizes the plurality of second captured image data so that the overlapping regions included in the plurality of images of the plurality of second captured image data overlap each other to generate image data of a synthesized image.

An image processing method according to another embodiment includes acquiring, at a first time and a second time that is a time after the first time respectively, a plurality of captured image data obtained by capturing a plurality of images. The plurality of captured image data obtained at the first time is a plurality of first captured image data. The plurality of captured image data obtained at the second time is a plurality of second captured image data. Each image includes an overlapping region in an image capturing region of the own image. The overlapping region is a region where the image capturing regions of the images overlap each other. The image processing method further includes detecting, from the plurality of first captured image data, a target object that is an object set to be recognized in advance, determining an adjustment region by estimating a position of the target object at the second time based on a change in a position of the target object from a time before the first time to the first time, determining a color adjustment gain based on the adjustment region of the plurality of first capturing image data, performing color balance adjustment processing on the plurality of second captured image data based on the color adjustment gain, and synthesizing the plurality of second captured image data so that the overlapping regions included in the plurality of images of the plurality of second captured image data overlap each other to generate image data of a synthesized image.

According to one embodiment, it is possible to provide a semiconductor device or the like which suppresses deterioration of visibility of an object.

BRIEF DESCRIPTION OF THE DRAWINGS

FIG. 24 is a flowchart showing an example of object selection processing in the semiconductor device according to the second embodiment.

DETAILED DESCRIPTION

Figure 1:
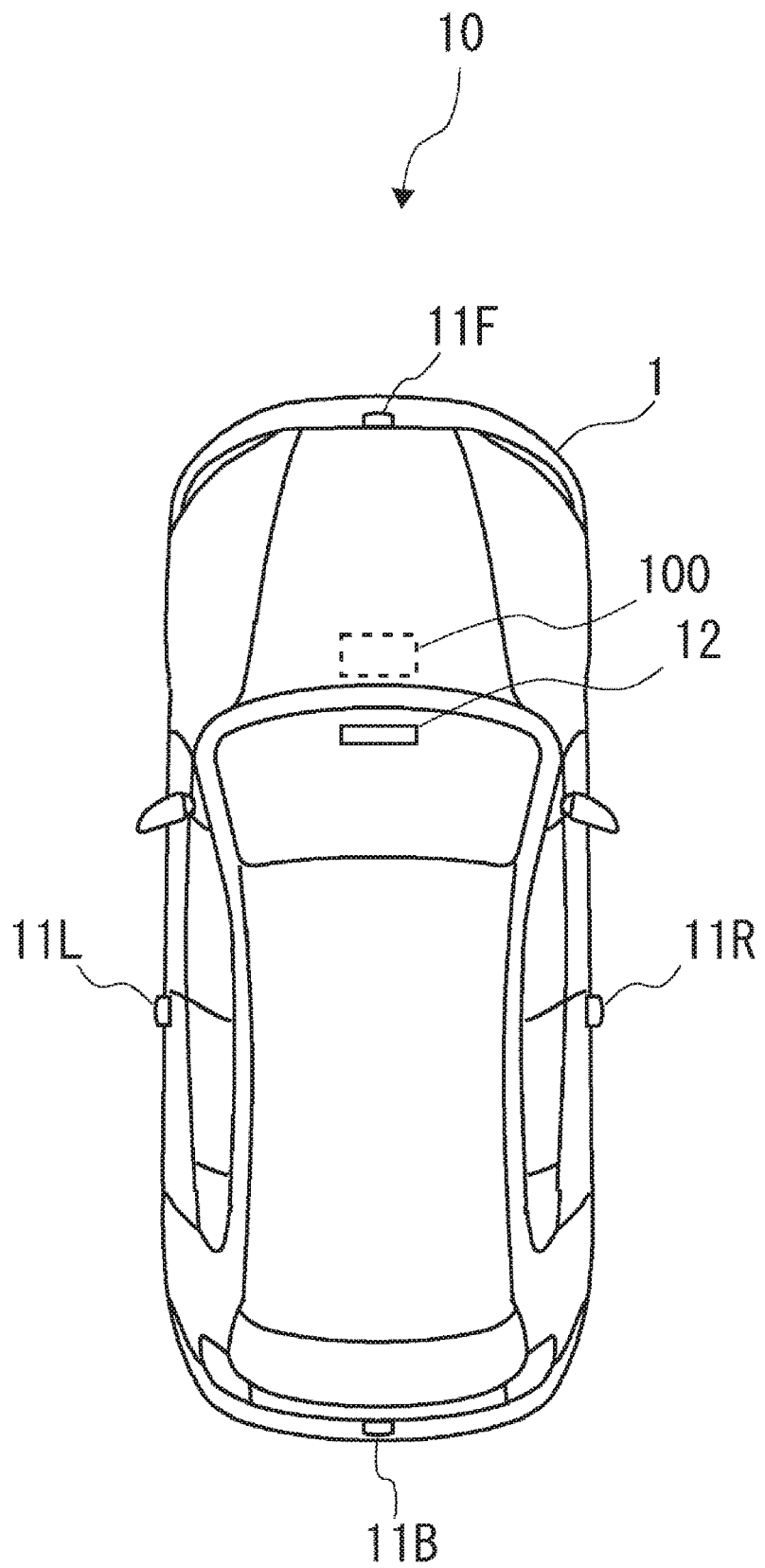
FIG. 1 is an overview of an automobile equipped with an image processing system according to a first embodiment.

For clarification of description, the following description and drawings are appropriately omitted and simplified. In addition, each of elements which are illustrated in the drawings as functional blocks for performing various types of processing is able to be configured by a Central Processing Unit (CPU), a memory, and other circuits in hardware is implemented by a program and so forth which is loaded into a memory and so forth in software. Accordingly, a person skilled in the art would understand that these functional blocks are able to be realized/implemented in various forms only by hardware, only by software or by a combination of the hardware and the software and are not limited to any one of them. Therefore, in the following description, a configuration illustrated as a circuit may be implemented by either the hardware or the software, or both, and a configuration shown as a circuit for implementing a certain function may also be shown as part of the software for implementing the similar function. For example, a configuration described as a control circuit may be described as a control unit. Incidentally, in the respective drawings, the same numerals are assigned to the same elements and duplicated description thereof is omitted as necessary.

First Embodiment

Figure 2:
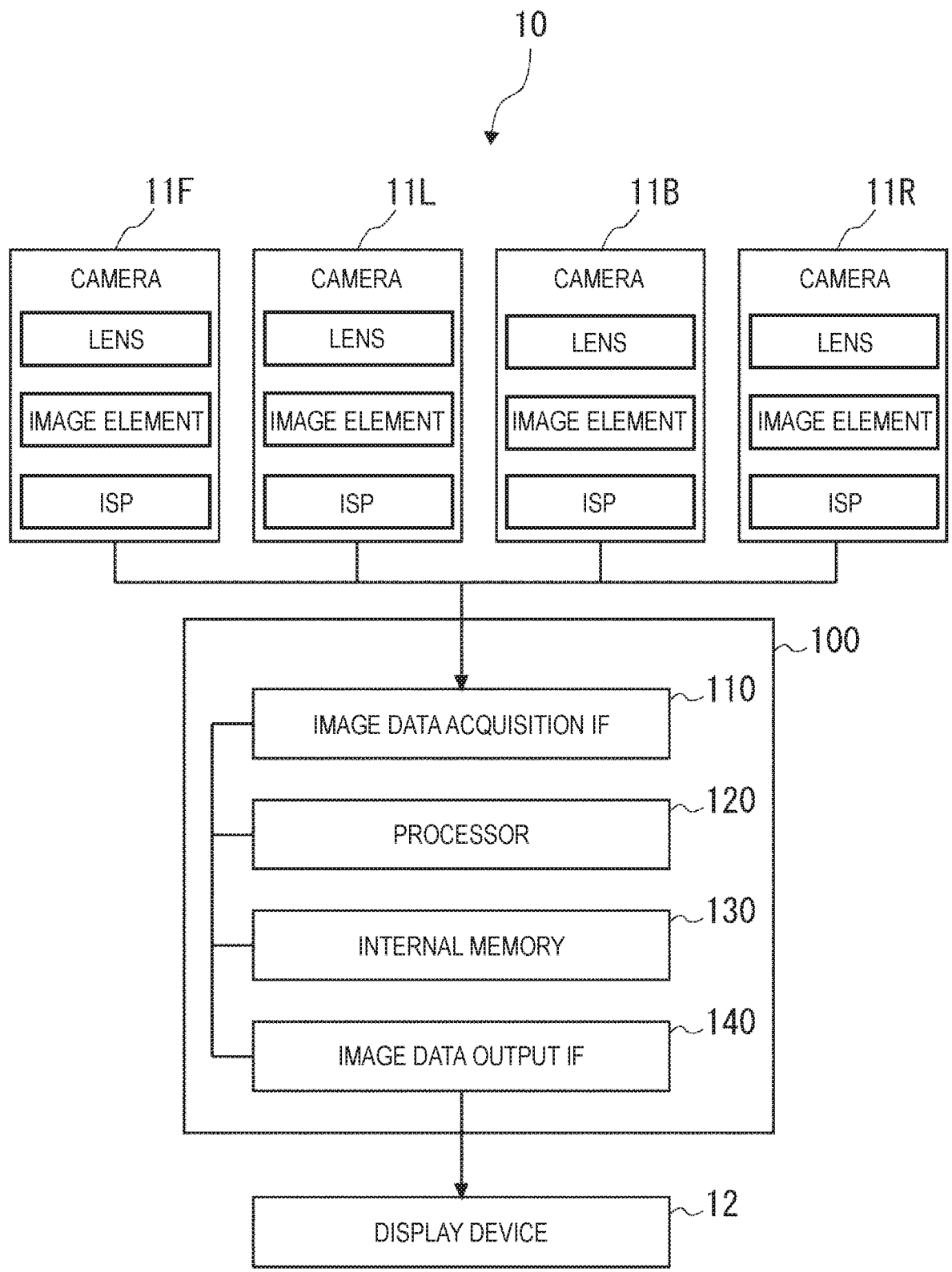
FIG. 2 is a schematic configuration diagram of the image processing system according to the first embodiment.

Referring to FIGS. 1 and 2, an outline of a configuration of a first embodiment will be described. FIG. 1 is an outline of an automobile equipped with an image processing system according to the first embodiment. The image processing system 10 is mounted on an automobile 1 shown in the drawing. The drawing is a top view of the automobile 1. The upper side of the drawing is the front side of the automobile 1. The left side of the drawing is the left side of the automobile 1. The lower side of the drawing is the rear side of the automobile 1. The right side of the drawing is the right side of the automobile 1.

FIG. 2 is a schematic configuration diagram of the image processing system according to the first embodiment. FIG. 2 schematically shows a main hardware configuration of the image processing system 10 mounted on the automobile 1. Hereinafter, each configuration of the image processing system 10 will be described with reference to FIGS. 1 and 2.

The image processing system 10 is a system for capturing an image of the periphery of the automobile 1, performing predetermined processing on the captured image data, and displaying the processed image to the driver or the like. The image processing system 10 includes a camera 11F, a camera 11L, a camera 11B, a camera 11R, a display device 12, and a semiconductor device 100 as main components of the image processing system 10.

The camera 11F, the camera 11L, the camera 11B, and the camera 11R are imaging devices for capturing scenery around the automobile 1 respectively. Each of these four cameras includes lenses, an image element for converting an image into an electric signal, an Image Signal Processor (ISP) for generating image data from the electric signal generated by the image element, and the like. The ISP is an image signal processing device for appropriately adjusting image quality for each pixel with respect to the electric signal generated by the image element. With such a configuration, each camera automatically adjusts color balance or the like in accordance with a preset algorithm, and outputs the adjusted image data. That is, objects photographed in an indoor special lighting environment or in sunset are difficult to identify. On the other hand, the ISP has a function of changing a signal level for each of R, G, and B of each pixel by executing the algorithm so that the object can be easily identified like an object photographed by natural light (white light).

Further, the four cameras process image data so as to conform to a predetermined file format. The predetermined file format is, for example, an Exchangeable image file format (Exif). The image data processed so as to conform to the Exif includes information such as captured date and time, a camera model, an aperture value, the number of pixels, and a color adjustment gain along with the captured image data. Color adjustment processing performed by the ISP is also referred to as initial color adjustment processing, Automatic White Balance (AWB) processing, or color balance processing. The image data conforming to the Exif is configured such that data management, data exchange between devices, data output at an optimum setting, and the like are performed based on such information. Further, each of these four cameras is connected to the semiconductor device 100, and supplies the generated image data to the semiconductor device 100.

Among the four cameras, the camera 11F is installed at the front side of the automobile 1 so as to capture an image of the front of the automobile 1. Similarly, the camera 11L is installed on the left side of the automobile 1 so as to capture an image of the left of the automobile 1. Similarly, the camera 11B is installed at the rear side of the automobile 1 so as to capture an image of the rear of the automobile 1, and the camera 11R is installed at the right side of the automobile 1 so as to capture an image of the right of the automobile 1.

Note that each of the four cameras includes an overlapping image capturing region. Since the camera 11F that captures of an image of the front of the automobile 1 and the camera 11L that captures of an image of the left of the automobile 1 each capture an image of the left front of the automobile 1, the image capturing region of the camera 11F and the image capturing region of the camera 11L overlap with each other in the left front portion of the automobile 1. Similarly, the image capturing region of the camera 11L and the image capturing region of the camera 11B overlap with each other in the left rear portion of the automobile 1. Similarly, the image capturing region of the camera 11B and the image capturing region of the camera 11R overlap with each other in the right rear portion of the automobile 1, and the image capturing region of the camera 11R and the image capturing region of the camera 11F overlap with each other in the right front portion of the automobile 1. As described above, since the four cameras each include the overlapping regions, the image processing system 10 captures images of the front, rear, left, and right of the automobile 1 without a break.

The semiconductor device 100 acquires image data from the four cameras, performs predetermined processing on the acquired image data, and outputs the processed image data to the display device 12. The semiconductor device 100 is configured by electric components including a CPU, a memory, and the like, and is installed at any position of the automobile 1. The semiconductor device 100 includes an image data acquisition interface (IF) 110, a processor 120, an internal memory 130, and an image data output IF 140 as main components of the semiconductor device 100. Each component of the semiconductor device 100 is connected to each other by an internal bus.

The image data acquisition IF110 is an interface for acquiring image data from the above described four cameras. When the image data acquisition IF110 acquires image data from the cameras, the image data acquisition IF 110 supplies the acquired image data to the processor 120 or the internal memory 130.

The processor 120 is an arithmetic unit for performing predetermined processing on the image data acquired from the cameras in cooperation with the internal memory 130. As a main function, the processor 120 specifies a target object which is an object set to be recognized in advance based on image data acquired at a predetermined time, and determines an adjustment region by estimating a position of the target object based on a positional change of the target object. In addition, the processor 120 determines a color adjustment gain for adjusting color balance based on the adjustment region in the image data, and performs color adjustment processing on the image data based on the color adjustment gain. Further, the processor 120 synthesizes the image data of the images captured by the four cameras so that the overlapping portions overlap each other to generate a synthesized image.

The internal memory 130 is a storage unit for temporarily storing image data in cooperation with the processor 120, and storing target object information for specifying an object in advance. The internal memory 130 is configured by a volatile memory such as a Dynamic Random Access Memory (DRAM) or a Synchronous Dynamic Random Access Memory (SDRAM), a non-volatile memory such as a flash memory, or a combination thereof. The image data output IF140 is an interface for outputting the processed image data generated by the processor to the display device.

The display device 12 is a device for displaying image data received from the semiconductor device 100, and includes an image data input circuit, a display unit, a display driver, and the like. The display unit is configured by, for example, a liquid crystal panel, an organic Electro Luminescence (EL) panel, a Head-up Display (HUD), or the like. For example, the display device 12 is installed, for example, on a dashboard, a center cluster, or the like which is easy for the driver to see.

Figure 3:
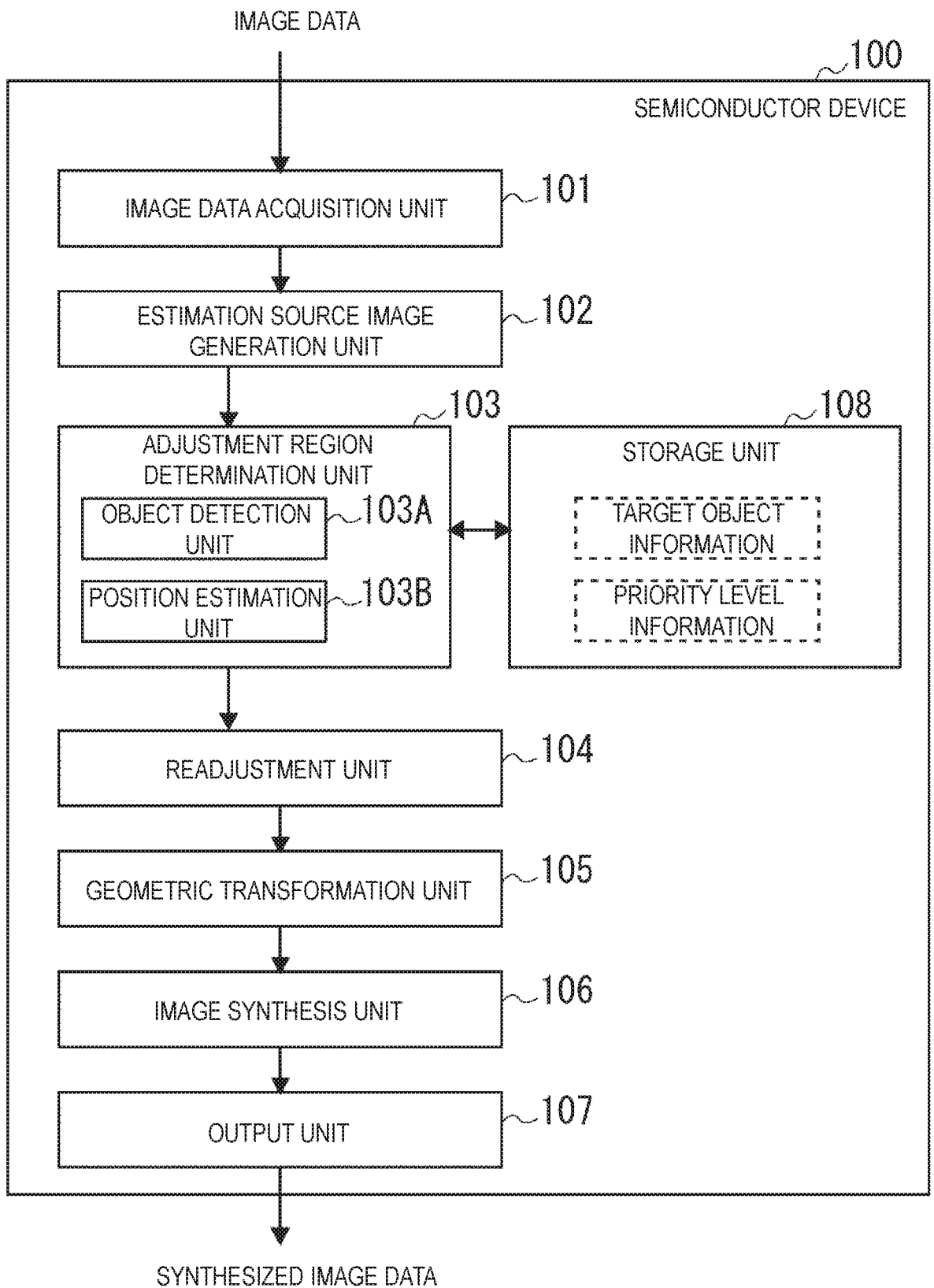
FIG. 3 is a functional block diagram of a semiconductor device according to the first embodiment.

Next, functions of the semiconductor device 100 and processing performed by the semiconductor device 100 will be described. FIG. 3 is a functional block diagram of the semiconductor device according to the first embodiment. The semiconductor device 100 includes an image data acquisition unit 101, an estimation source image generation unit 102, an adjustment region determination unit 103, a readjustment unit 104, a geometric transformation unit 105, an image synthesis unit 106, an output unit 107, and storage unit 108, as a main functional blocks of the semiconductor device 100.

Figure 4:
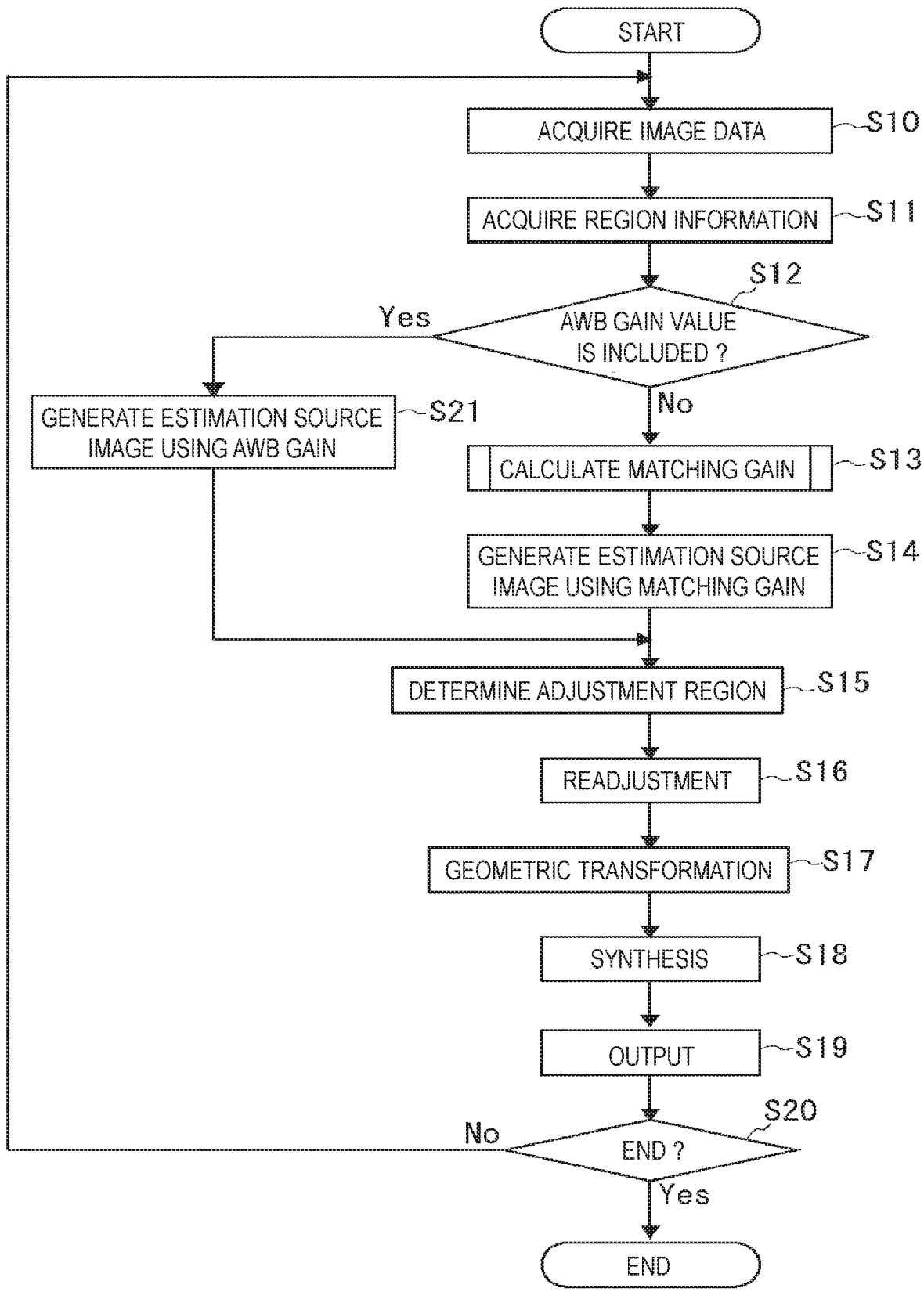
FIG. 4 is a flowchart showing processing of the semiconductor device according to the first embodiment.

FIG. 4 is a flowchart showing the processing of the semiconductor device according to the first embodiment. The semiconductor device 100 implements the processing of FIG. 4 by the functional blocks shown in FIG. 3. The processing of FIG. 4 will be described below with reference to the functional blocks of FIG. 3.

First, the image data acquisition unit 101 acquires image data from the four cameras described above (step S10). The image data acquired by the image data acquiring unit 101 has a file format conforming to the Exif. The image data includes, for example, an image composed of a plurality of pixels in a Joint Photographic Experts Group (JPEG) format. Each of the plurality of pixels has three signal levels of R, G, and B. Further, the image data includes information such as an AWB gain. The image data acquisition unit 101 supplies the acquired image data to the estimation source image generation unit 102.

The image data acquisition unit 101 continuously acquires the image data from the four cameras for each preset period. The preset period is, for example, 1/30 second (in other words, frequency of 30 Hz) or 1/60 second (in other words, 60 frequency of 60 Hz). In the case of acquiring image data from a camera in this manner, acquisition of image data for one time is also referred to as one frame. For example, when image data is acquired every 1/30 second, the image data acquisition unit 101 acquires the image data at a frame rate of 30 Hz. The image data acquisition unit 101 acquires, from all four cameras, image data for one time captured by each camera per one frame.

Here, an example of deriving an AWB gain included in image data will be described. The ISP of the camera receives an image composed of a plurality of pixels from the image element. Each pixel of the plurality of pixels included in the image has three signal levels of R, G, and B. Each signal level is represented by an 8-bit gradation (0-255). Here, a set of the signal levels of R of the image is denoted by R0. Similarly, a set of the signal levels of G of the image is denoted by G0, and a set of the signal levels of B of the image is denoted by B0. When the ISP of the camera receives an image from the image pickup device, the ISP extracts an achromatic color region from the center portion of the image. In the present disclosure, the term "achromatic color" refers to a color in which a difference between a maximum value and a minimum value of each signal level of RGB is smaller than a preset value. For example, the achromatic color in the present disclosure may be a color in which the difference between the maximum value and the minimum value of each signal level of RGB is smaller than 10. Here, a set of signal levels of R in the achromatic color region extracted by the ISP is defined as C_R0. Similarly, a set of signal levels of G in the achromatic color region is defined as C_G0, and a set of signal levels of B in the achromatic color region is defined as C_B0. Naturally, a plurality of pixels of the extracted achromatic color region are included in a plurality of pixels constituting the image. The ISP of the camera determines an AWB gain to adjust color balance so that this achromatic color region approaches white. In the present disclosure, "white" means a color in which a difference between signal levels of R, G, and B is substantially 0. Specifically, the ISP determines the AWB gains (parameters) α, γ, and β to be multiplied by integrated values of C_R0, C_G0, and C_B0 so that the respective integrated values are equal in the following equation.

$$\alpha \int_{center\ of\ image} C\_R0 = \gamma \int_{center\ of\ image} C\_G0 = \beta \int_{center\ of\ image} C\_B0$$ [Equation 1]

The ISP multiplies each of the AWB gains (parameters) α, γ, and β determined in this manner by each of signal levels R, G, and B of pixels of the entire image. As a result, the set of the signal levels of R of the image is changed to R1, the set of the signal levels of G of the image is changed to G1, and the set of the signal levels of B of the image is changed to B1. And, an image including R1, G1, and B1 is generated. This image is an image included in the image data described above.

$$\begin{pmatrix} R1 \\ G1 \\ B1 \end{pmatrix} = \begin{pmatrix} \alpha R0 \\ \gamma G0 \\ \beta B0 \end{pmatrix}$$ [Equation 2]

It should be noted that, finally, what color white is to be displayed is generally determined by a color setting of an output device such as a display or a printer. In this manner, the ISP generates a pixel signal in which the color balance of the pixel signal received from the image element is adjusted. Then, the ISP outputs image data obtained by adding various types of information corresponding to the Exif to the generated pixel signals.

The above processing is an example of AWB processing in a general camera. In the four cameras of the present disclosure, the same processing is performed. That is, each of the four cameras performs AWB processing. Therefore, values of the AWB gains determined by the four cameras are not necessarily the same.

Figure 5:
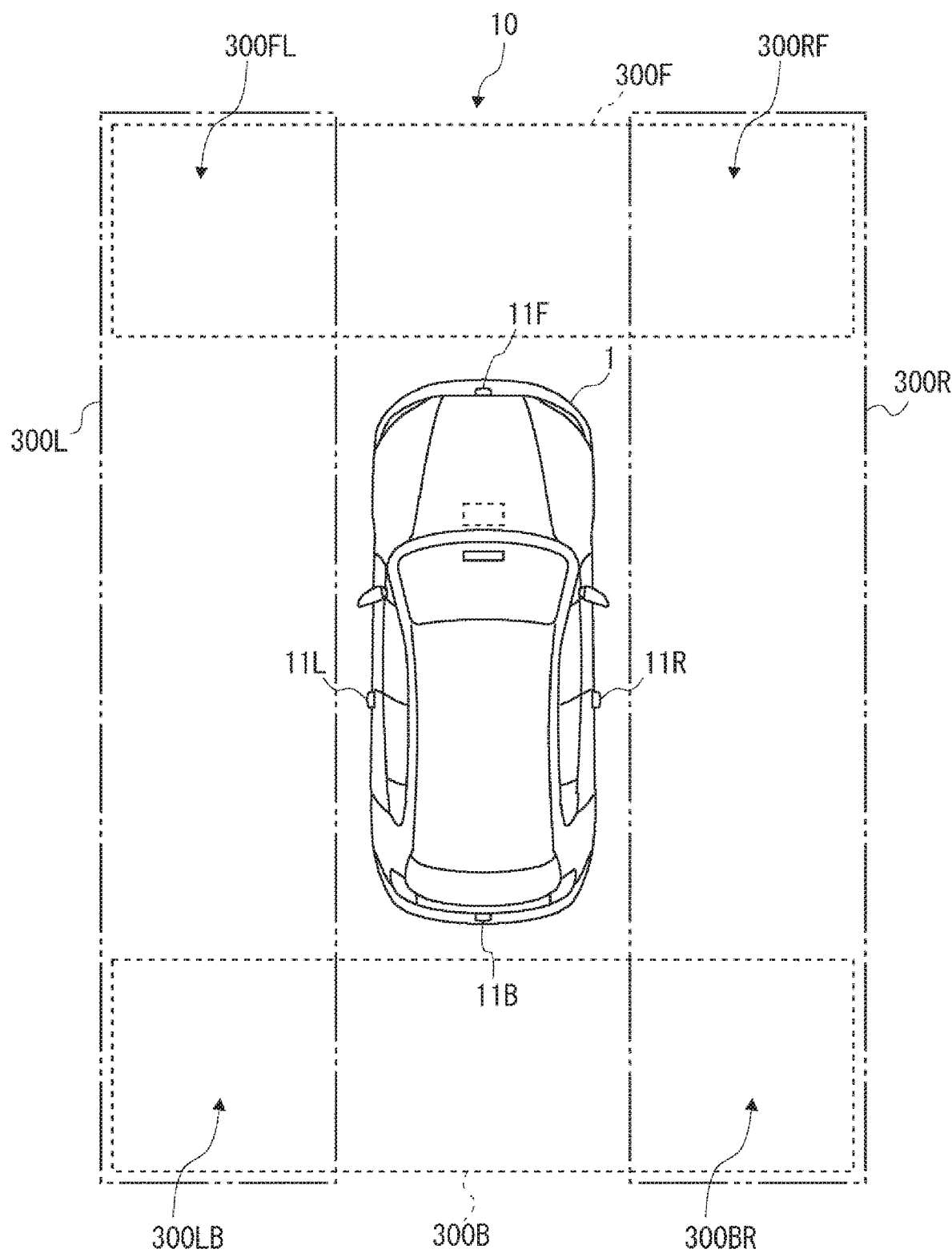
FIG. 5 is a diagram showing an example of image capturing regions captured by cameras of the image processing system.

Next, an image capturing region of an image will be described with reference to FIG. 5. FIG. 5 is a diagram showing an example of an imaging region imaged by a camera included in the image processing system. The camera 11F installed in the front side of the automobile 1 is set so as to capture an image in the image capturing region 300F. Similarly, the camera 11L installed on the left side of the automobile 1 is set to capturing of an image in an image capturing region 300L, the camera 11B installed on the rear side is set to capturing an image in the image capturing region 300B, and the camera 11R installed on the right side is set to capture an image in the image capturing region 300R.

Further, an overlapping region 300FL is a region where the image capturing region 300F of the camera 11F and the image capturing region 300L of the camera 11L overlap. Similarly, an overlapping region 300LB is a region in which the image capturing region 300L of the camera 11L and the image capturing region 300B of the camera 11B overlap. Similarly, an overlapping region 300BR is a region where the image capturing region 300B of the camera 11B and the image capturing region 300R of the camera 11R overlap. An overlapping region 300RF is a region where the image capturing region 300R of the camera 11R and the image capturing region 300F of the camera 11F overlap.

As described above, the images captured by the four cameras may include the overlapping regions, while the four cameras may determine the different AWB gains. Therefore, for example, when the AWB gain determined by the camera 11F for capturing the front image and the camera 11L for capturing the left image are different from each other, the color balance in the overlapping region 300FL included in the image capturing region 300F and the color balance of the overlapping region 300FL included in the image capturing region 300L are different from each other.

Next, the semiconductor device 100 acquires region information of each image data (step S11). The region information is information for defining a pixel signal included in image data acquired from each camera in a region having a plurality of pixels set in advance. For example, the region information includes, for example, information on an angle of view of image data to be acquired and an overlapping region, and is stored in advance in the internal memory 130. Therefore, the semiconductor device 100 compares the region information stored in advance with the image data acquired from the cameras 11F, for example, and thereby defines pixel signals included in the image data in a preset area.

Figure 6:
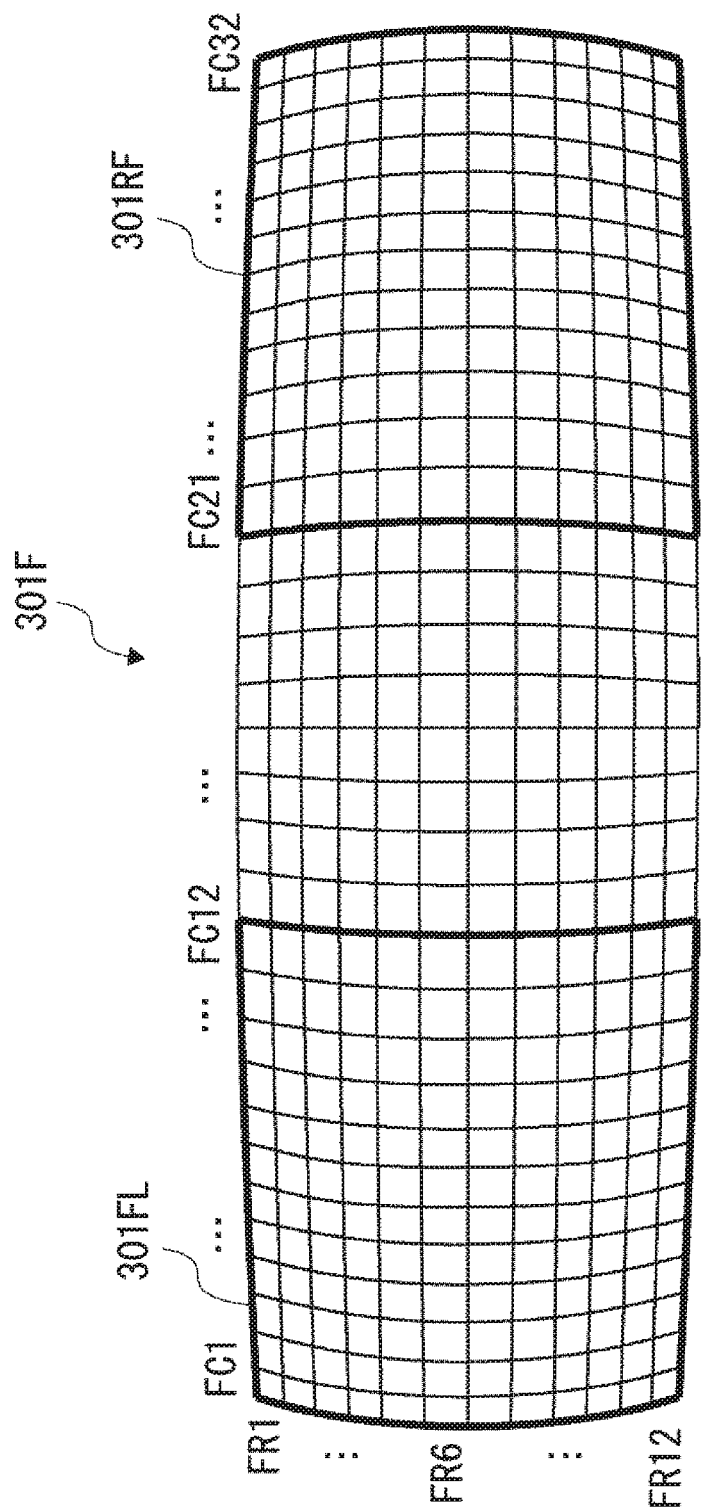
FIG. 6 is a diagram showing an example of image data generated by a front camera.

The region information will be described with reference to FIGS. 6 and 7. FIG. 6 is a diagram showing an example of image data generated by the front camera (camera 11F). The image data 301F shown in the drawing is generated by the camera 11F capturing an image of the image capturing region 300F. In the image data 301F, a barrel-shaped distortion occurs due to influence of aberration of a wide-angle lens of the camera 11F.

In the present embodiment, the image data is shown in a barrel-shaped distorted form, but the image data supplied from the cameras is generally rectangular. Here, for easy understanding, image data of a portion used in a display region to be described later among rectangular image data is extracted and described.

The image data 301F is divided into lattice-shaped regions along the barrel-shaped distortion. In the present embodiment, the image data 301F is divided into 32 pieces in the horizontal direction and 12 pieces in the vertical direction starting from the left upper of the image. Each of the divided regions is hereinafter referred to as a processing region. That is, the image data 301F is divided into the 384(=32×12) processing regions. Here, for convenience of explanation, the image data 301F is given numbers from FC1 to FC32 in the horizontal direction and numbers from FR1 to FR12 in the vertical direction. For example, a left upper portion of the image data 301F is indicated as a processing region (FC1, FR1).

An overlapping region 301FL indicated by a thick frame in the drawing is a region corresponding to the overlapping region 300FL shown in FIG. 5. The overlapping region 301FL occupies a range from a processing region (FC1, FR1) to a processing region (FC12, FR12). Similarly, an overlapping region 301RF indicated by a thick frame in the drawing is a region corresponding to the overlapping region 300RF shown in FIG. 5. The overlap region 301RF occupies a range from a processing region (FC21, FR1) to a processing region (FC32, FR12).

Figure 7:
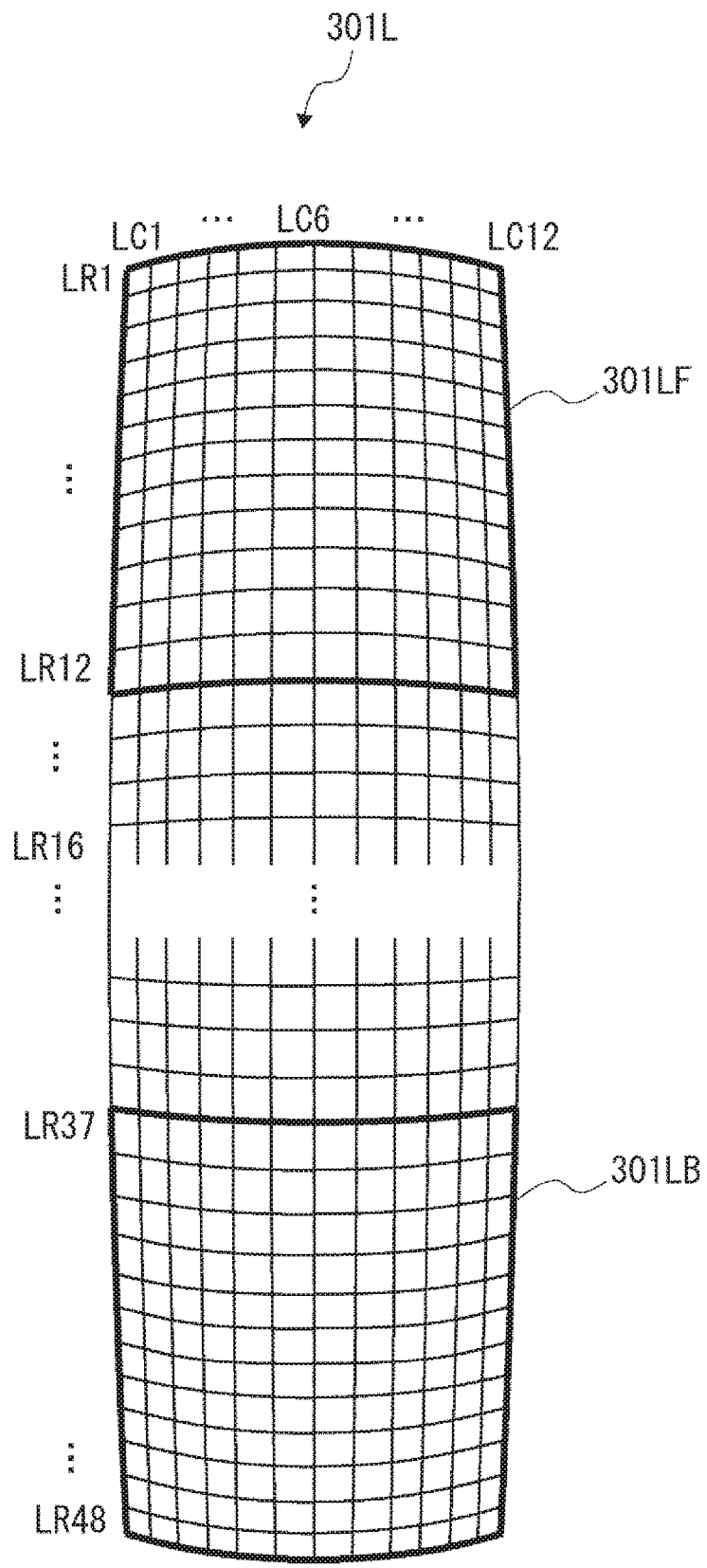
FIG. 7 is a diagram showing an example of image data generated by a left camera.

FIG. 7 is a diagram showing an example of image data generated by the left camera (camera 11L). The image data 301L shown in the drawing is generated by the camera 11L capturing an image of the image capturing region 300L. Note that the image data shown in FIG. 7 is also divided into processing regions having a plurality of pixels as in the description of FIG. 6, and numbers are given to the respective regions in the horizontal direction and the vertical direction so as to be able to indicate the respective regions. That is, the image data 301L is divided into 12 in the horizontal direction and 48 in the vertical direction, and is divided into the 576(=12×48) processing regions. A left upper portion of the image data 301L is denoted as a processing region (LC1, LR1), and a right lower portion of the image data 301L is denoted as a processing region (LC12, LR48).

An overlapping region 301LF indicated by a thick frame in the drawing is a region corresponding to the overlapping region 300FL shown in FIG. 5. The overlap region 301LF occupies a range from a processing region (LC1, LR1) to a processing region (LC12, LR12). Similarly, an overlapping region 301LB indicated by a thick frame in the drawing is a region corresponding to the overlapping region 300LB shown in FIG. 5. The overlapping region 301LB occupies a range from a processing region (LC1, LR37) to a processing region (LC12, LR48).

Next, correspondence relationships between the overlapping regions will be described. The overlapping region 301FL of the image data 301F shown in FIG. 6 has a correspondence relationship with the overlapping region 301LF of the image data 301L shown in FIG. 7. More specifically, the processing region (FC1, FR1) of the image data 301F corresponds to the processing region (LC1, LR1) of the image data 301L, and they are image data obtained by capturing an image of a shared region. Similarly, the processing region (FC12, FR1) of the image data 301F corresponds to the processing region (LC12, LR1) of the image data 301L. Similarly, the processing region (FC1, FR12) of the image data 301F corresponds to the processing region (LC1, LR12) of the image data 301L. The processing region (FC12, FR12) of the image data 301F corresponds to the processing region (LC12, LR12) of the image data 301L.

The region information includes information capable of defining the processing regions and the overlapping regions of each of the above-described image data. Therefore, the semiconductor device 100 acquires the region information, defines the processing regions and the overlapping regions of each image data, and determines the correspondence relations between the overlapping regions.

Next, the estimation source image generation unit 102 performs processing of generating estimation source image data for each of the received image data in accordance with the following steps. The estimation source image generation unit 102 determines whether an AWB gain value is included in the received image data (step S12). Here, the term "AWB gain value" indicates a specific value of the AWB gain, and does not include information such as "auto".

When the information on the AWB gain is not included in the image data (No in step S12), the estimation source image generation unit 102 calculates a matching gain (step S13). By calculating the matching gain and using the calculated matching gain, the semiconductor device 100 can cancel the effect of the initial color adjustment processing performed by the ISP on the image data.

Figure 8:
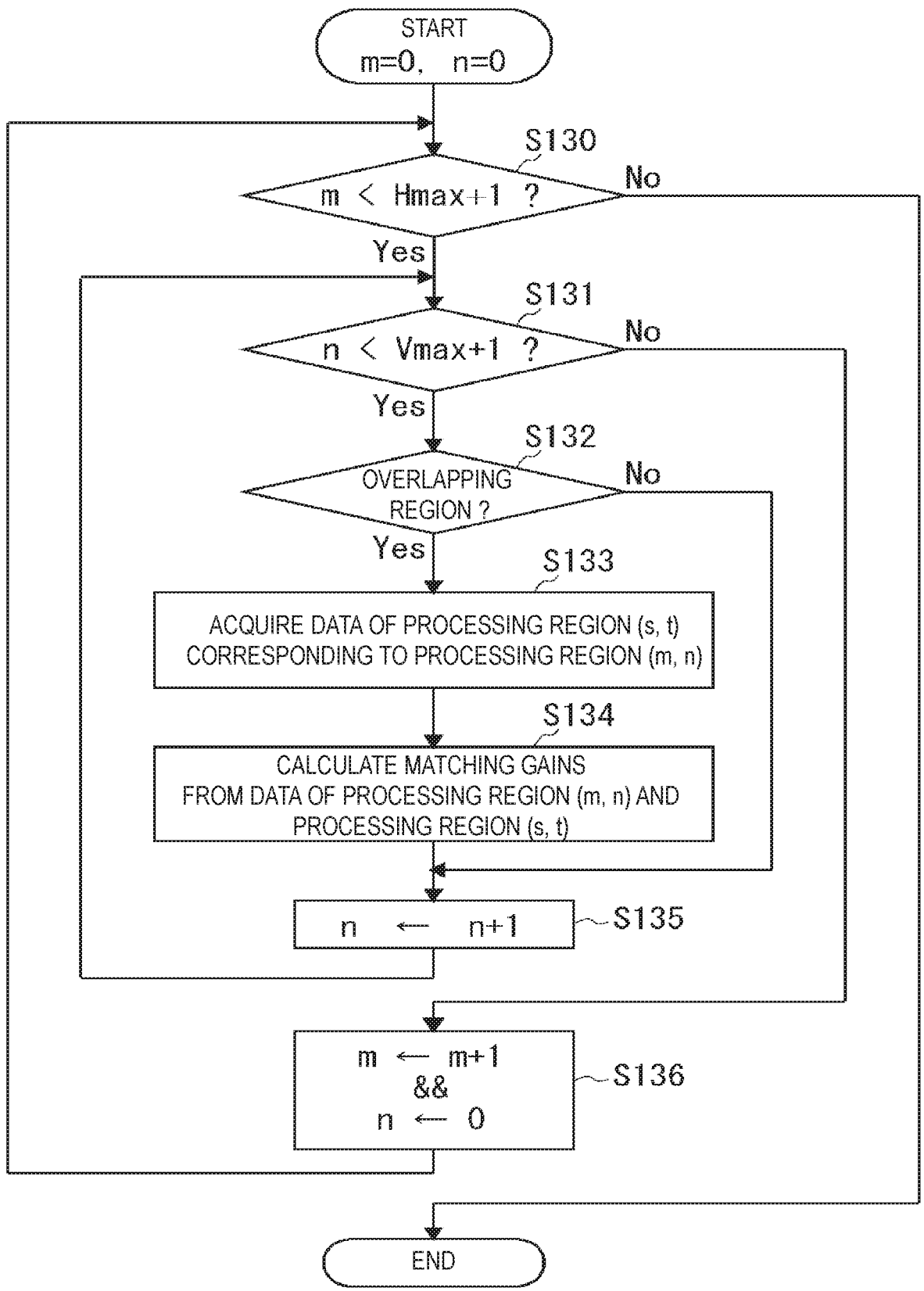
FIG. 8 is a flowchart showing a series of processing at a time of calculation of a matching gain performed by the semiconductor device.

Details of the processing in the step S13 will be described with reference to FIG. 8. FIG. 8 is a flowchart showing a series of processing at a time of calculation of the matting gain performed by the semiconductor device. The series of the processing at the time of calculating the matching gain will be described below by taking image data of an arbitrary image as an example. In the example described here, the processing proceeds while sequentially incrementing coordinates of the processing region in the horizontal direction of image data from 0 to Hmax and coordinates of the processing region in the vertical direction of image data from 0 to Vmax.

First, the estimation source image generation unit 102 determines whether or not a coordinate in the horizontal direction of a given processing region is less than Hmax+1 (step S130). When it is determined that the coordinate in the horizontal direction of the processing region is less than Hmax+1 (Yes in step S130), the estimation source image generation unit 102 determines whether a coordinate in the vertical direction is less than Vmax+1 (step S131). When the coordinate in the vertical direction is less than Vmax+1 (Yes in step S131), the estimation source image generation unit 102 determines whether or not the processing region is included in an overlapping region (step S132). When it is determined that the processing region is included in the overlapping region (Yes in step S132), the estimation source image generation unit 102 acquires data relating to signal levels of each of R, G, and B of a processing region (s, t) in another image data corresponding to the processing region (m, n) (step S133). The data relating to the signal levels for each of R, G, and B in the processing region (m, n) and the signal levels for each of R, G, and B in the processing region (s, t) handled here is, for example, a value obtained by averaging signal levels of specific pixels in the processing region having a plurality of pixels for each of R, G, and B. The specific pixel is a pixel having an achromatic color and a luminance value higher than a preset value. Further, the preset value is, for example, 200 or more of 256 gradations.

In addition, when there are not enough specific pixels in each processing region (e. g., 5% or more), it is considered that information for estimating an original light source is not sufficiently obtained, and a matching gain to be described later is not calculated in this processing region.

Next, the estimation source image generation unit 102 calculates a matching gain from the data relating to the signal levels for each of R, G, and B of the processing region (m, n) described above and the data relating to the signal levels for each of R, G, and B of the processing region (s, t) (step S134). Here, for example, the signal levels of each color in the processing region (m, n) included in the image data 301F and the signal levels of each color in the processing region (s, t) included in the image data 301L can be defined by the following equation.

$$\begin{pmatrix} \frac{1}{\alpha} F_{(m,n)}\_R \\ \frac{1}{\gamma} F_{(m,n)}\_G \\ \frac{1}{\beta} F_{(m,n)}\_B \end{pmatrix} = \begin{pmatrix} \frac{1}{\alpha'} L_{(s,t)}\_R \\ \frac{1}{\gamma'} L_{(s,t)}\_G \\ \frac{1}{\beta'} L_{(s,t)}\_B \end{pmatrix}$$ [Equation 3]

Here, α is an AWB gain (parameter) for the R signal of the image data 301F, γ is an AWB gain (parameter) for the G signal of the image data 301F, and β is an AWB gain (parameter) for the B signal of the image data 301F. $F_{(m,n)}\_R$ is a value obtained by averaging the signal levels of R of pixels, which are achromatic color and have luminance values higher than a preset value, in the region (m, n), $F_{(m, n)}\_G$ is a value obtained by averaging the signal levels of G of pixels, which are achromatic color and have luminance values higher than a preset value, in the region (m, n), and $F_{(m, n)}\_B$ is a value obtained by averaging the signal levels of B of pixels, which are achromatic color and have luminance values higher than a preset value in the region (m, n). α' is an AWB gain (parameter) for the R signal of the image data 301L, γ' is an AWB gain (parameter) for the G signal of the image data 301L, and β' is an AWB gain (parameter) for the B signal of the image data 301L. $L_{(s, t)}\_R$ is a value obtained by averaging the signal levels of R of pixels, which are achromatic color and have luminance values higher than a preset value, in the region (s, t), $L_{(s, t)}\_G$ is a value obtained by averaging the signal levels of G of pixels, which are achromatic color and have luminance values higher than a preset value, in the region (s, t), and $L_{(s, t)}\_B$ is a value obtained by averaging the signal levels of B of pixels, which are achromatic color and have luminance values higher than a preset value, in the region (s, t). As shown in the equation 3, pixel signals of regions corresponding to the overlapping regions are multiplied inverse numbers of the AWB gains applied by the ISPs of the cameras, respectively, and become pixel signals before adjusting color balance. As a result, signal levels for each color between the corresponding regions are equal for each other.

Using the above principle, a gain for matching signal levels of each color of the regions corresponding to the overlapping region with respect to image data that does not include the information on the AWB gain is calculated in accordance with the following equation.

$$\begin{pmatrix} \alpha_{Fe} F_{(m,n)}\_R \\ \gamma_{Fe} F_{(m,n)}\_G \\ \beta_{Fe} F_{(m,n)}\_B \end{pmatrix} = \begin{pmatrix} \alpha_{Le} L_{(s,t)}\_R \\ \gamma_{Le} L_{(s,t)}\_G \\ \beta_{Le} L_{(s,t)}\_B \end{pmatrix} = \frac{1}{2} \begin{pmatrix} F_{(m,n)}\_R + L_{(s,t)}\_R \\ F_{(m,n)}\_G + L_{(s,t)}\_G \\ F_{(m,n)}\_B + L_{(s,t)}\_B \end{pmatrix}$$ [Equation 4]

Here, α Fe is a matching gain (parameter) for the R signal in the processing region (m, n) of the image data 301F. Similarly, γFe is a matching gain (parameter) of the G signal in the processing region (m, n) of the image data 301F, and β Fe is a matching gain (parameter) of the B signal in the processing region (m, n) of the image data 301F. Further, α Le is a matching gain (parameter) of the R signal in the processing region (s, t) of the image data 301L. Similarly, γLe is a matching gain (parameter) of the G signal in the processing region (s, t) of the image data 301L, and β Le is a matching gain (parameter) of the B signal in the processing region (s, t) of the image data 301L.

As described above, the estimation source image generation unit 102 calculates the matching gains for each of the received image data. However, the above example is based on the assumption that the processing regions having the correspondence relationship in the overlapping regions completely overlap. In the case where the processing regions having the correspondence relationship do not completely overlap, and are shifted in position, a matching gain is calculated by weighting as described below.

Figure 9:
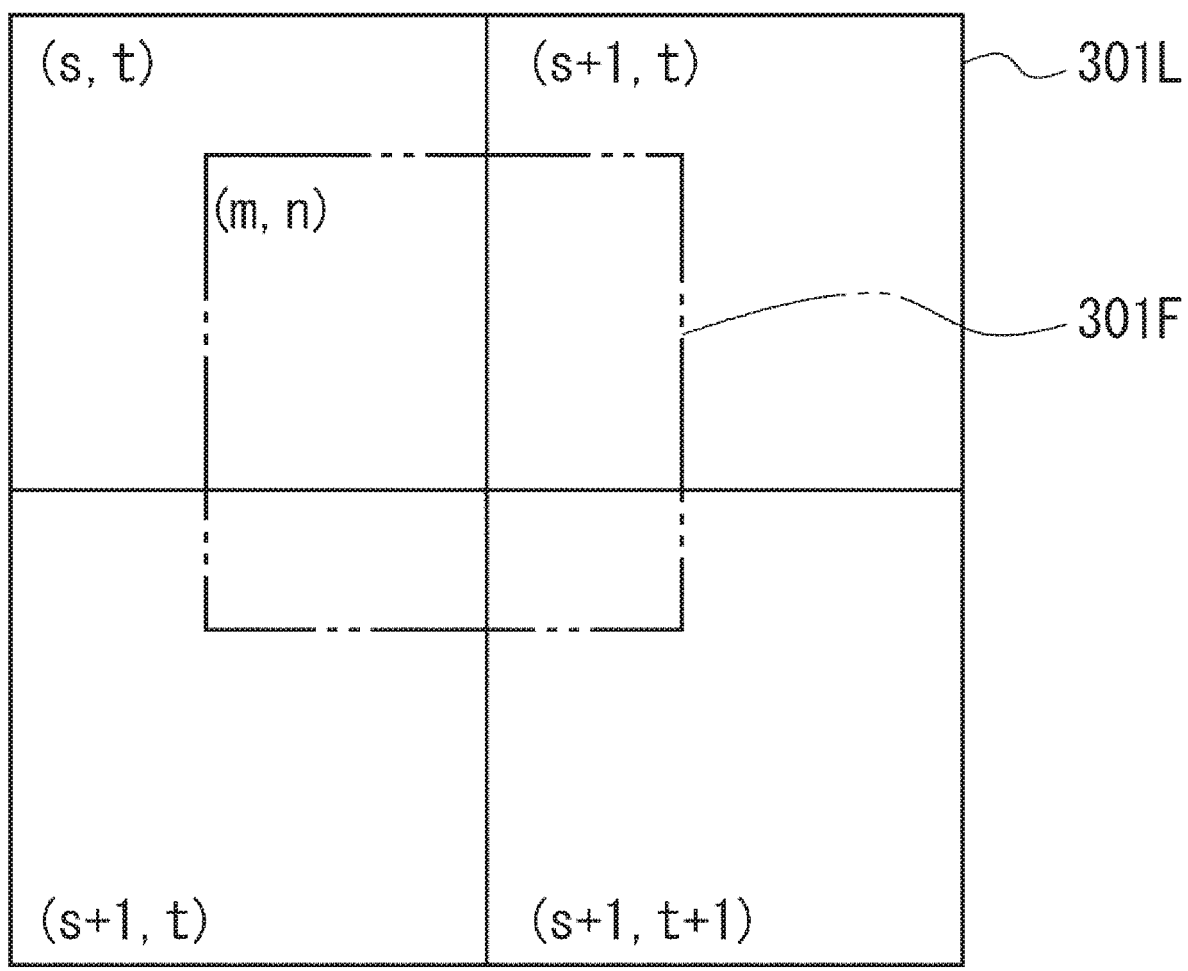
FIG. 9 is a diagram showing an example in which processing regions in overlapping regions do not completely overlap.

FIG. 9 is a diagram showing an example in which the processing regions in the overlapping regions do not completely overlap. As shown in the drawing, the processing region (m, n) of the image data 301F does not completely overlap the corresponding processing region (s, t) of the image data 301L, and the processing region (m, n) is shifted to the right lower with respect to the processing region (s, t). In such a case, a matching gain is calculated by weighting as shown in the following equation.

$$\alpha_{Fe} F_{(m,n)_R} =$$
$$\alpha_{Le} L_{(s,t)_R} = \frac{1}{2} \left\{ F_{(m,n)_R} + \frac{w_1 \times L_{(s,t)_R} + w_2 \times L_{(s+1,t)_R} + w_3 \times L_{(s+1,t+1)_R} + w_4 \times L_{(s+1,t+1)_R}}{4} \right\}$$ [Equation 5]

Here, $W_1$, $W_2$, $W_3$, and $W_4$ is a weighting factor, and $W_1+W_2+W_3+W_4=4$.

Returning to FIG. 8, after the matching gain is calculated in a step S134, the estimation source image generation unit 102 increments n in order to move a region in which a matching gain is calculated (step S135). After incrementing n, the estimation source image generation unit 102 returns to the step S131 and continues the processing.

When it is not determined in the step S132 that the processing region is included in the overlapping region (No in step S132), the estimation source image generation unit 102 proceeds to the step S135 and performs processing for incrementing n (step S135).

In the step S131, when n exceeds the Vmax value which is a maximum value of the coordinate in the vertical direction, the estimation source image generation unit 102 does not determine that n is less than the Vmax+1 (No in step S131). In this case, the estimation source image generation unit 102 sets n to zero and increments m (in step S136). Then, the estimation source image generation unit 102 returns to the step S130 and continues the processing. In the step S130, when m exceeds the Hmax value which is a maximum value of the coordinate in the horizontal direction, the estimation source image generation unit 102 does not determine that m is less than the Hmax+1 (No in step S130). In this case, the estimation source image generation unit 102 ends the series of the processing.

In the example of the matching gain calculation described in the present embodiment, the matching gain is calculated for each processing region. The semiconductor device 100 may further calculate an average value of a plurality of matching gains calculated in this manner. Instead of the average value, a value based on a standard deviation may be calculated, or a representative value may be selected. Alternatively, these calculations may be performed after excluding outliers. Further, from the viewpoint of calculating the average value of the plurality of matching gains, a plurality of regions may be grouped as one processing region, and the matching gain may be calculated for each of the plurality of processing regions of the image data.

Furthermore, for example, the estimation source image generation unit 102 performs the above-described calculation processing on the image data 301F in relation to the image data 301L having the overlapping region corresponding to the overlapping region of the image data 301F, and similarly performs the above-described calculation processing on the image data 301F in relation to the image data 301R having the overlapping region corresponding to the overlapping region of the image data 301F. Therefore, the estimation source image generation unit 102 determines one matching gain for the image data 301F from all the matching gains.

Returning to FIG. 4, the estimation source image generation unit 102 generates an estimation source image using the matching gain calculated as described above (step S14). By using the matching gain, for example, the signal levels for each of R, G, and B of the image data 301F and the signal levels for each of R, G, and B of the image data 301L have the following relationship.

$$\begin{pmatrix} \alpha_{Fe} F\_R \\ \gamma_{Fe} F\_G \\ \beta_{Fe} F\_B \end{pmatrix} \approx \begin{pmatrix} \alpha_{Le} L\_R \\ \gamma_{Le} L\_G \\ \beta_{Le} L\_B \end{pmatrix}$$ [Equation 6]

Here, α FE, γ FE, and β FE are matching gains (parameters) for the image data 301F, and α LE, γ LE, and β LE are matching gains (parameters) for the image data 301L. The estimation source image generation unit 102 calculates, for each image data, a matching gain for matching the signal levels of each color in the processing regions corresponding to each other in the overlapping regions, and multiplies the matching gain by the signal level of each color of the pixels included in the corresponding image data. Thus, the estimation source image generation unit 102 generates the estimation source image data. As described above, by calculating a matching gain and using the calculated matching gain, the semiconductor device 100 can cancel the effect of the initial color adjustment processing performed by the ISP on the image data.

Returning to the step 12, when the information on the AWB gain is included in the image data (Yes in step S12), the estimation source image generation unit 102 generates an estimation source image using the AWB gain (step S21). In this case, the estimation source image generation unit 102 can cancel the effect of the initial color adjustment processing performed by the ISP on the image data by multiplying pixel signals of each region by an inverse number of a value of the AWB gain.

Next, as shown in FIG. 3, the estimation source image generation unit 102 cancels the effects of the initial color adjustment processing performed by the ISPs using the processing of the step S14 or the step S21 as described above, and then supplies image data of the generated estimation source images to the adjustment region determination unit 103.

The adjustment region determination unit 103 determines an adjustment region for performing color balance adjustment processing on an estimation source image. The adjustment region determination unit 103 includes an object detection unit 103A and a position estimation unit 103B, as main functional blocks of the adjustment region determination unit 103.

The object detection unit 103A detects attributes and sizes of target objects present in image data with reference to the target object information stored in the storage unit 108. The target object information includes a feature amount, attribute information, and the like of an object in image data.

The feature amount of the object in the image data is information for estimating presence of an object based on a change in pixel values included in the image data such as, for example, a Histograms of Oriented Gradients (HOG) feature amount. The attribute information of the object is information for classifying a detected object from the viewpoint of safe driving. The detected objects are classified into humans, automobiles, bicycles, traffic signs, and the like based on the attribute information.

The position estimation unit 103B calculates a moving direction and a moving speed of the object by detecting a change with time in a position of the object detected by the object detection unit 103A. The position estimation unit 103B estimates the position after elapse of a predetermined time of the object by calculating the moving direction and the moving speed of the object. By using the above-described functions, the adjustment region determination unit 103 estimates, for example, the position after the elapse of the predetermined time of the object detected by the object detection unit 103A, and determines a region including the estimated position as an adjustment region.

When detecting a plurality of target objects in image data, the adjustment region determination unit 103 determines an adjustment region by specifying a first target object having the highest priority according to a determination criterion set in advance and estimating a position of the first target object in image data after elapse of a predetermined time.

In an example of the determination criterion set in advance, a position of the automobile 1 and a position of each of a plurality of target objects at a predetermined time are used as a determination criterion. According to this, the adjustment region determination unit 103 estimates a position after elapse of a predetermined time of the target object, and specifies a first target object based on a distance between the position of the automobile 1 and the estimated position of the target object.

In another example of the determination criterion set in advance, the adjustment region determination unit 103 specifies a first target object based on an attribute of the target object. The attribute of the target object is stored as priority level information in the storage unit 108. The storage unit 108 stores the priority level information in which the attribute of the target object and the priority level are associated with each other.

When detecting a plurality of target objects in image data, the adjustment region determination unit 103 specifies a second target object having the second highest priority next to the first target object. Then, the adjustment region determining unit 103 estimates the position of the first target object in the image data after the elapse of the predetermined time to determine a first adjustment region, and estimates a position of the second target object to determine a second adjustment region. By determining the second adjustment region according to the second target object in this manner, it is possible to smoothly perform switching processing when the first target object no longer exists in the image data.

The adjustment region determination unit 103 having the above-described functions determines an adjustment region from a generated estimation source image data (step S15). An example of the processing of determining an adjustment region performed by the adjustment region determination unit 103 will be described below.

Figure 10:
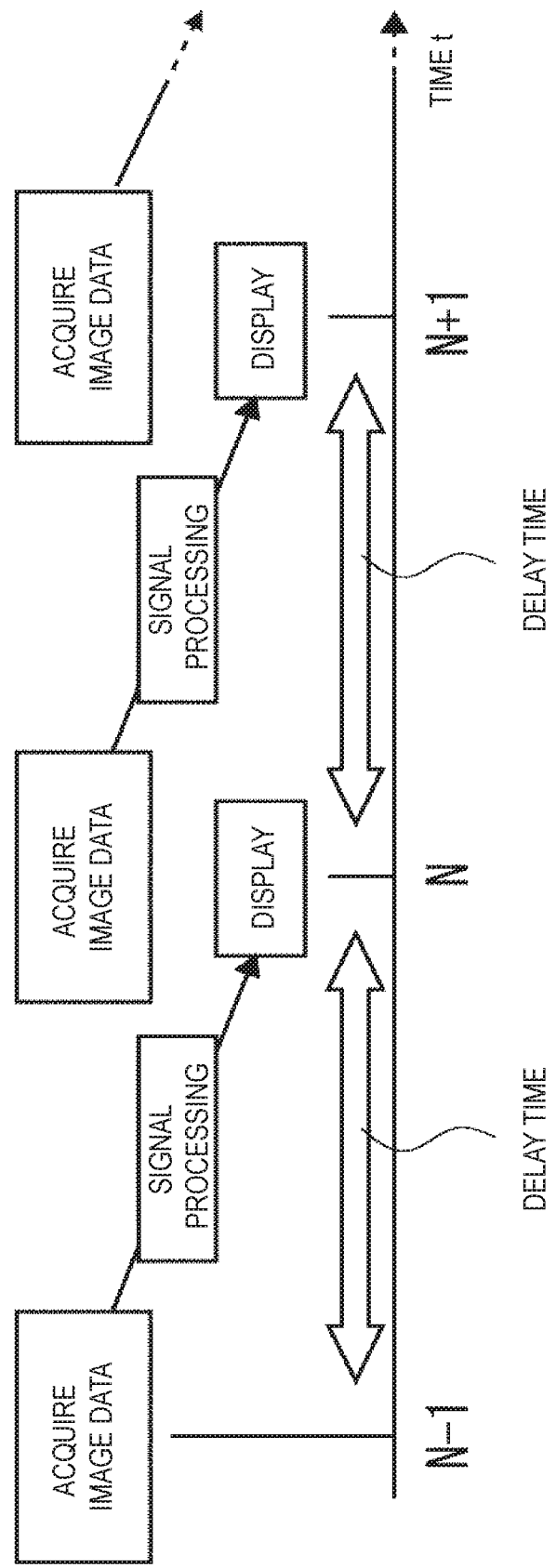
FIG. 10 is a diagram showing an example of a processing time of the semiconductor device.

FIG. 10 is a diagram showing an example of a processing time of the semiconductor device. After the semiconductor device 100 acquires image data from the cameras, when the semiconductor device 100 performs various processing on the acquired image data, the semiconductor device 100 requires a predetermined process time for performing the processing. As shown in the drawing, for example, the semiconductor device 100 acquires image data from cameras at a time t=N−1. The semiconductor device 100 performs various processing on the acquired image data. The semiconductor device 100 outputs the processed image data to the display device at a time t=N. Similarly, the semiconductor device 100 acquires image data from the cameras at the time t=N, performs various processing on the acquired image data, and outputs the processed image data to the display device at a time t=N+1. As described above, when the semiconductor device 100 performs predetermined processing on acquired image data, a delay time is produced. Therefore, the semiconductor device 100 performs processing in which the delay time is considered in advance.

Figure 11:
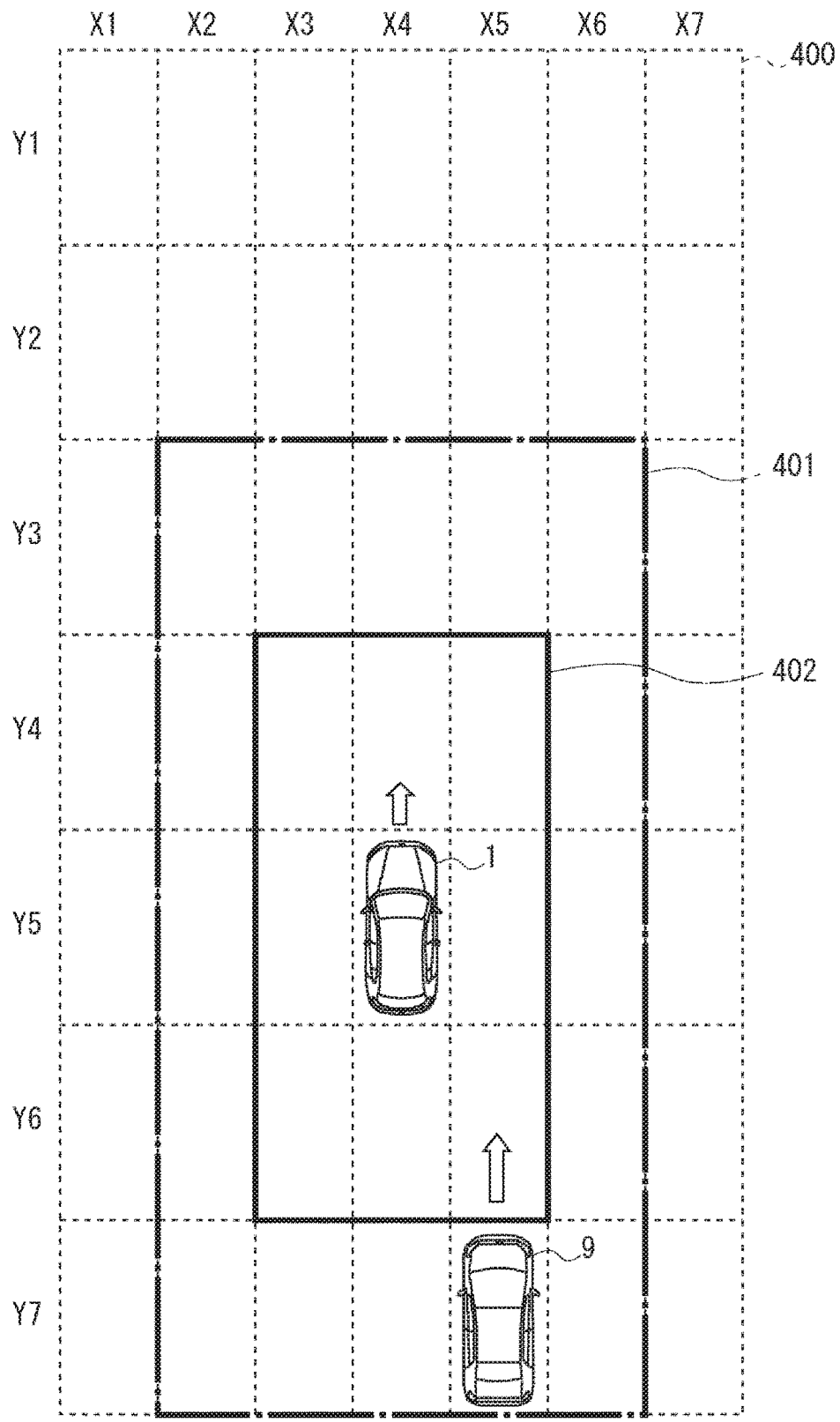
FIG. 11 is a diagram in which other automobile travels near an automobile on which the image processing system is mounted.
Figure 12:
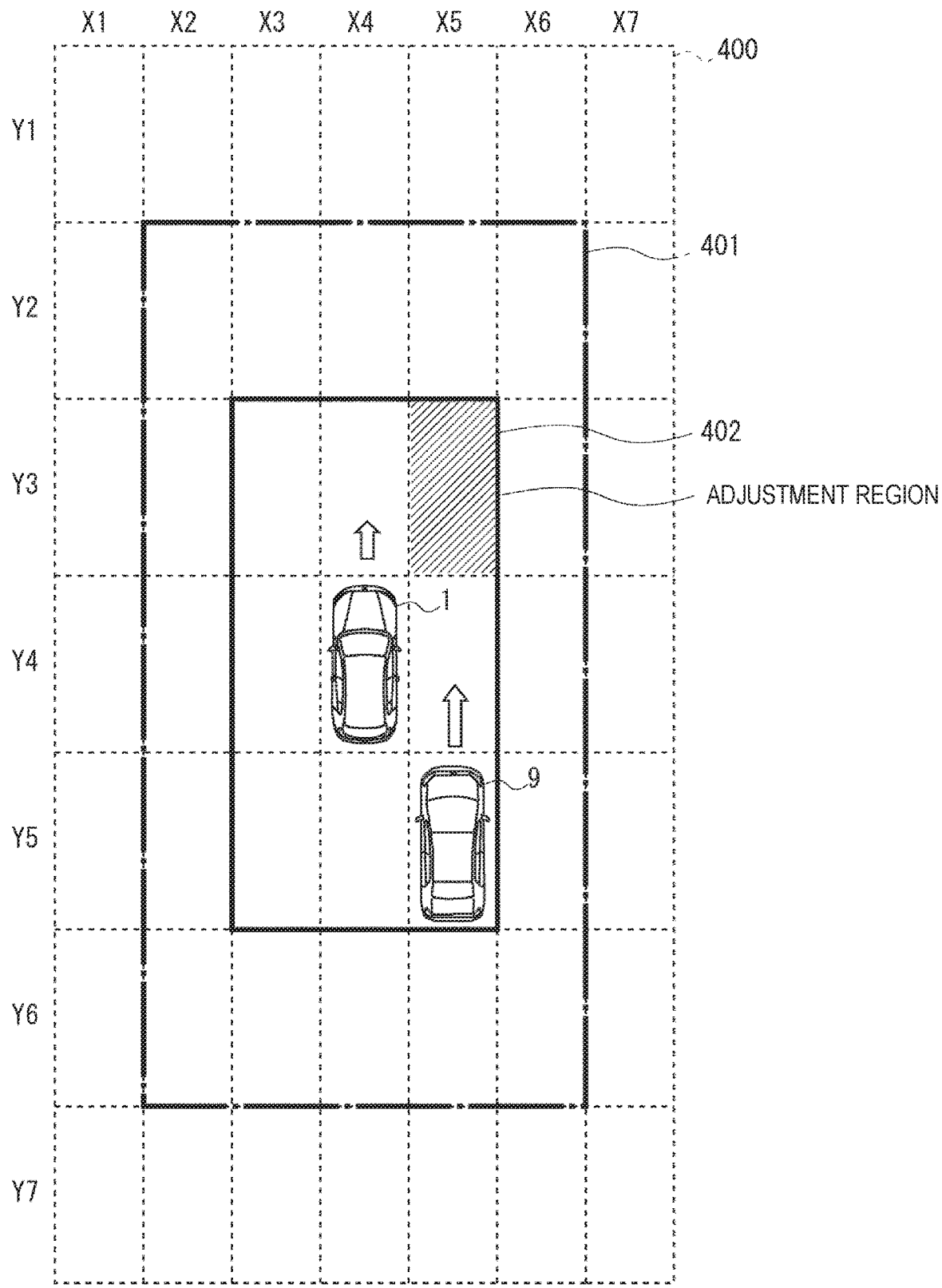
FIG. 12 is a diagram in which the other automobile travels near the automobile on which the image processing system is mounted.
Figure 13:
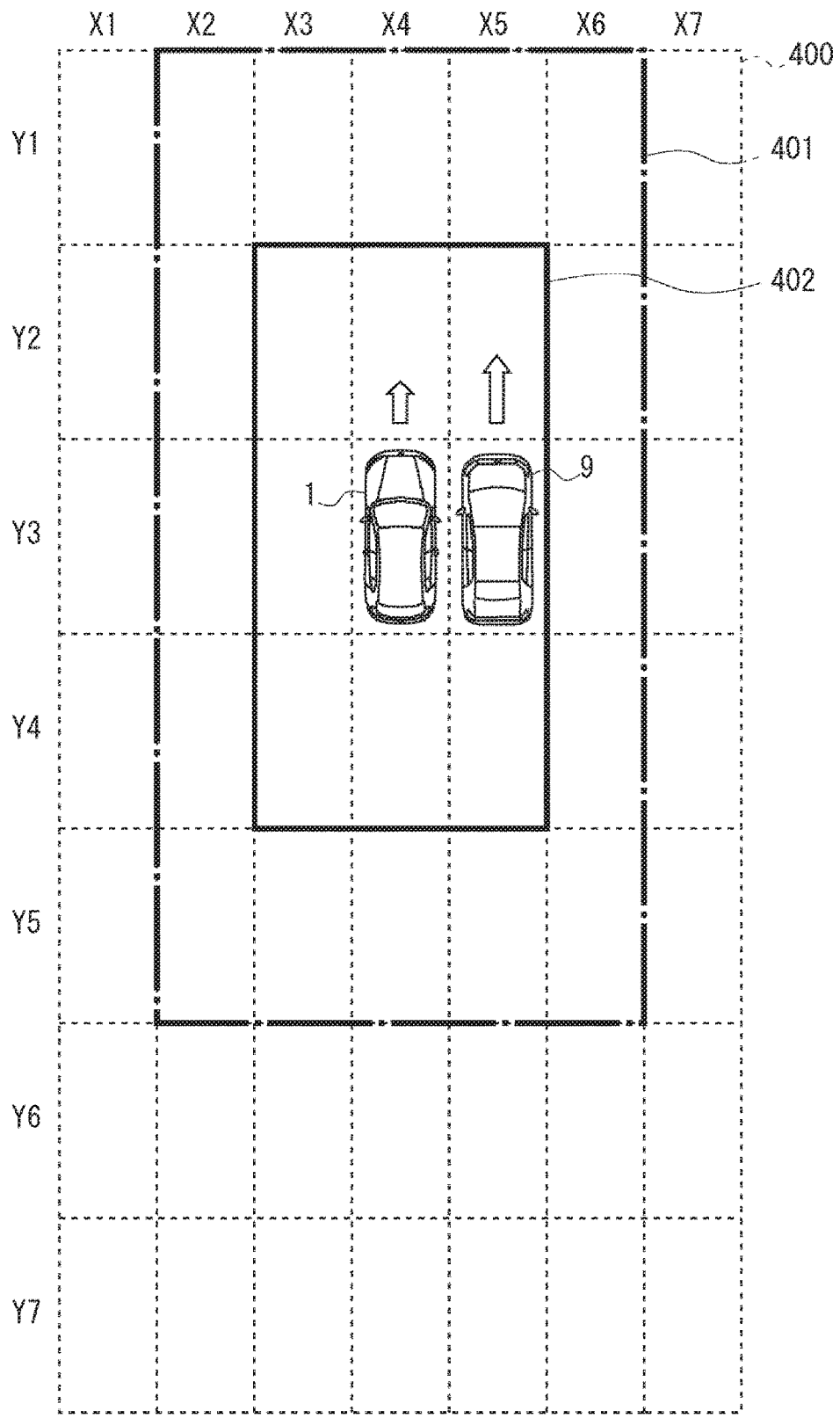
FIG. 13 is a diagram in which the other automobile travels near the automobile on which the image processing system is mounted.

Next, a specific example of processing of determining an adjustment region will be described with reference to FIGS. 11 to 13. FIGS. 11 to 13 show a situation in which other automobile 9 is traveling around the automobile 1 on which the image processing system 10 is mounted, with passage of time. In FIGS. 11 to 13, a road 400 on which the automobile 1 is traveling is shown in a lattice shape by a dotted line. The road 400 is divided in the lattice shape for easy understanding. The road 400 is divided into a plurality of regions by being divided into seven in the vertical direction and seven in the horizontal direction. The divided regions of the road 400 are given coordinates X1 to X7 from the left in the horizontal direction, and coordinates Y1 to Y7 from the top in the vertical direction. A left upper divided region of the road 400 is denoted by the coordinates (X1, Y1).

A region of a rectangular indicated by a thick dashed line in the road 400 is a region where the automobile 1 can detect a target object, i.e., a detection region 401. A region of a rectangular indicated by a solid line inside the detection region 401 is a region displayed by the display device 12, i.e., a display region 402. The detection region 401 and the display region 402 are formed so as to surround the periphery of the automobile 1. The detection region 401 and the display region 402 have fixed relative positions with respect to the automobile 1. The automobile 1 is traveling along the road 400 in a direction of an arrow (upper direction of drawing). The other automobile 9 is approaching from the right rear side of the automobile 1.

FIG. 11 is a diagram showing a situation of the automobile 1 and the surroundings of the automobile 1 at the time t=N−1. At the time t=N−1, the automobile 1 is traveling along the coordinates (X4, Y5). Further, the other automobile 9 is traveling along the coordinates (X5, Y7). The semiconductor device 100 of the automobile 1 detects the other automobile 9 included in the detection region 401.

Next, FIG. 12 is a diagram showing a situation of the automobile 1 and the surroundings of the automobile 1 at the time t=N. At the time t=N, the automobile 1 is traveling along the coordinates (X4, Y4). Further, the other automobile 9 is traveling along the coordinates (X5, Y5). The adjustment region determination unit 103 included in the semiconductor device 100 detects a position of the other automobile 9 and estimates a moving speed and a moving direction after elapse of a predetermined time (time t=N+1) of the other automobile 9. Here, the adjustment region determination unit 103 calculates that the other automobile 9 approaches the right side of the automobile 1 at the time t=N+1 based on a change in a relative position between the automobile 1 and the other automobile 9. Further, the adjustment region determination unit 103 calculates that the automobile 1 is positioned at the coordinates (X4, Y3) at the time t=N+1.

FIG. 13 is a diagram showing a situation of the automobile 1 and the surroundings of the automobile 1 at the time t=N+1 estimated by the adjustment region determination unit 103. As shown in the drawing, the adjustment region determination unit 103 estimates that the automobile 1 is positioned at the coordinates (X4, Y3) and the other automobile 9 is positioned at the coordinates (X5, Y3) at the time t=N+1.

Returning to FIG. 12, as described above, at the time t=N, the adjustment region determination unit 103 determines the adjustment region of the image to be displayed at the time t=N+1 as the coordinates (X5, Y3) indicated by hatching. When the adjustment region is determined in this manner, the adjustment region determination unit 103 supplies information about the determined adjustment region to the readjustment unit 104. Thus, the adjustment region determination unit 103 detects a target object and estimates a position after elapse of a predetermined time of the target object, thereby determining an adjustment region.

Figure 14:
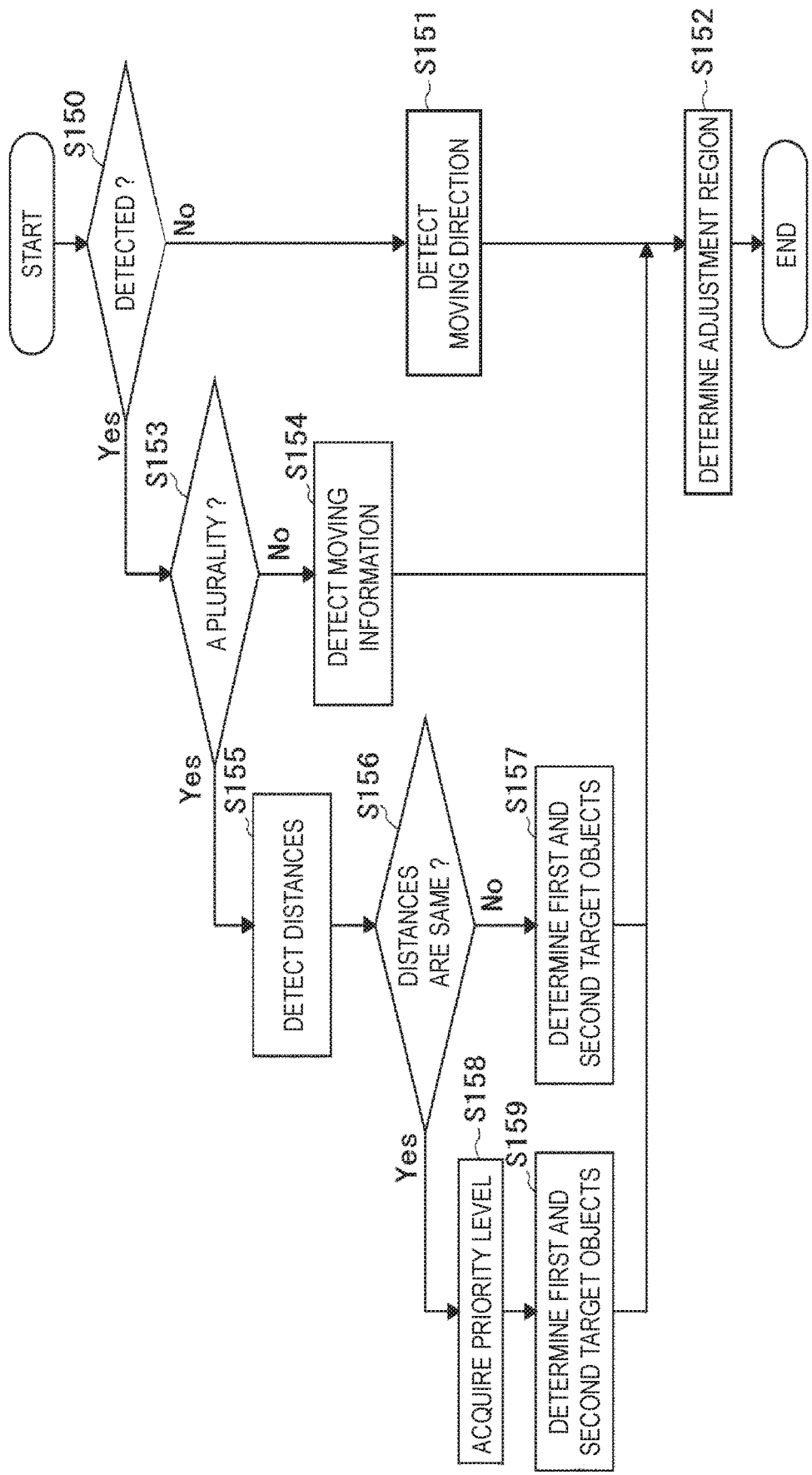
FIG. 14 is a flowchart showing processing of determining an adjustment region.

Next, with reference to FIG. 14, details of the processing of the adjustment region determination unit 103 will be further described. FIG. 14 is a flowchart showing the details of the processing for determining the adjustment region performed by the adjustment region determination unit 103 in the step S15 of FIG. 4.

First, the adjustment region determination unit 103 determines whether or not a target object is detected in image data (step S150). When it is not determined that the target object is detected in the image data (No in step S150), the adjustment region determination unit 103 detects a moving direction of the automobile 1 (step S151). The moving direction of the automobile 1 may be calculated based on images of a plurality of frames, or may be calculated based on a Global Positioning System (GPS) signal.

When detecting the moving direction of the automobile 1, the adjustment region determination unit 103 determines a region corresponding to the moving direction as an adjustment region (step S152). After determining the adjustment region, the adjustment region determination unit 103 ends the series of processing.

When it is determined that the target object is detected (Yes in step S150), the adjustment region determination unit 103 determines whether or not a plurality of target objects is detected (step S153).

When it is not determined that the plurality of target objects is detected (No in step S153), this means that one target object is detected in the image data. In this case, the adjustment region determination unit 103 detects moving information about the target object (step S154). That is, the adjustment region determination unit 103 estimates a position of the target object as in the examples shown in FIGS. 11 to 13. Then, the adjustment region determination unit 103 determines a region including the estimated position of the target object as the adjustment region (step S152).

When it is determined that the plurality of target objects is detected (Yes in step S153), this means that two or more target objects are detected in the image data. In this case, the adjustment region determination unit 103 detects distances between the automobile 1 and each of the plurality of target objects (step S155).

Next, the adjustment region determination unit 103 determines whether the detected distances between the automobile 1 and each of the plurality of target objects are the same (step S156). Here, "the distances are the same" means that the distances are substantially the same, and for example, if a difference between two detected distances is 10% or less, these distances are regarded as the same distance.

When it is not determined that the detected distances between the automobile 1 and each of the plurality of target objects are the same (No in step S156), the adjustment region determination unit 103 determines a first target object having the first priority and a second target object having the second priority in accordance with these distances (step S157). Then, the adjustment region determination unit 103 determines a first adjustment region according to the first target object and a second adjustment region according to the second target object, respectively (step S152), and ends the series of processing.

When it is determined that the detected distances between the automobile 1 and each of the plurality of target objects are the same (Yes in step S156), the adjustment region determination unit 103 acquires the priority level information stored in the storage unit 108 (step S158).

Figure 15:
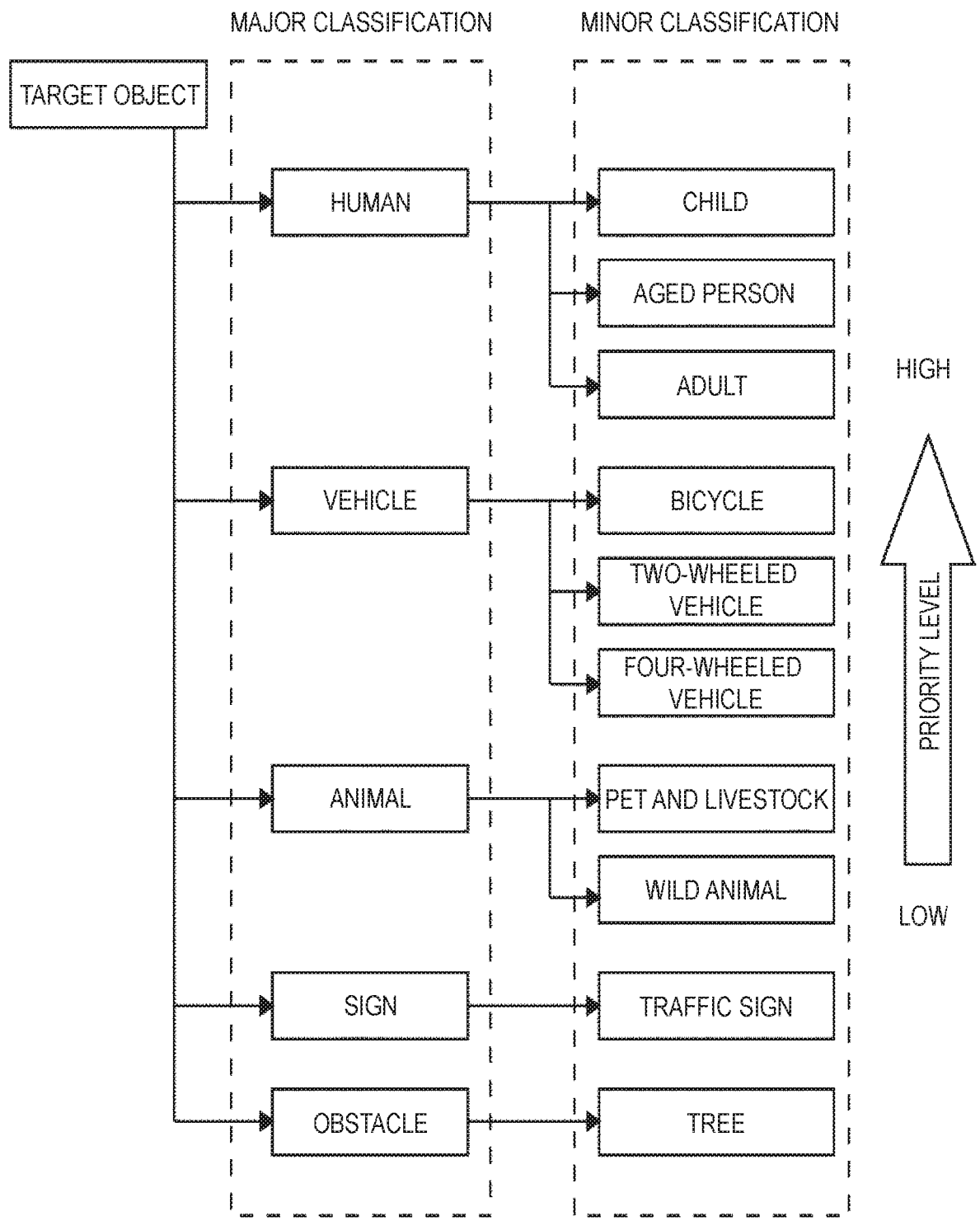
FIG. 15 is a diagram showing an example of a priority level of a target object.

FIG. 15 is a diagram showing an example of priority levels of target objects. As shown in the drawing, the priority level information classifies the target objects according to two types of categories for each attribute. The target objects are first classified into "human," "vehicle," "animal," "sign," and "obstacle" according to major classifications. Each of the target objects classified into major classifications is further classified into minor classifications. For example, a target object classified into the major classification "human" is classified into any one of "child", "aged person" and "adult" as the minor classification. The priority level is defined for each of the target objects classified as described above. In the example shown in the drawing, "tree" shown at the bottom of the minor classifications has the lowest priority, and "traffic sign" and "wild animal" shown above "tree" have the higher priority, and "child" has the highest priority. In the priority level information stored in the storage unit 108, the attribute of the target object and the priority level are associated with each other in this manner.

Incidentally, for example, it is conceivable that a plurality of target objects having the same distance from the automobile 1 and having the same attribute exist. For example, this is a case where two other four-wheeled vehicles are traveling in parallel behind the automobile 1. In such a case, the adjustment region determination unit 103 may specify, as the first target object, a target object that comes closer to the automobile 1 at a higher moving speed from the time when the target object is detected to the time when the predetermined time has elapsed.

The adjustment region determination unit 103 refers to the priority level information for each of the detected plurality of target objects, and determines the first target object and the second target object, respectively (step S159). Then, the adjustment region determination unit 103 determines the first adjustment region according to the first target object and the second adjustment region according to the second target object, respectively (step S152), and ends the series of processing.

Through the above-described processing, the adjustment region determination unit 103 determines an adjustment region. Then, the adjustment region determination unit 103 supplies information about the determined adjustment region and the image data to the readjustment unit 104.

Next, the readjustment unit 104 performs readjustment processing on the received image data using the information about the adjustment region (step S16). The readjustment processing is processing of readjusting color balance of estimation source image data. In calculating a readjustment gain, first, the readjustment unit 104 extracts, from the adjustment region, pixels which are achromatic color and have each signal level of R, G, and B higher than a preset value, as reference pixels. The preset value is, for example, 200 or more of 256 gradations. When the reference pixel occupies 5% or more of the pixels in the readjustment region, the readjustment unit 104 calculates a readjustment gain using the reference pixel. The readjustment unit 104 is also referred to as a color adjustment unit.

An example of a method of calculating the readjustment gain will be described below. The readjustment gain is calculated by the following equation, for example.

$$\begin{pmatrix} \alpha_{wb} \\ \gamma_{wb} \\ \beta_{wb} \end{pmatrix} = \begin{pmatrix} \frac{MIN(R, G, B)}{AVR(R)} \\ \frac{MIN(R, G, B)}{AVR(G)} \\ \frac{MIN(R, G, B)}{AVR(B)} \end{pmatrix}$$ [Equation 7]

Here, $\alpha_{wb}$, $\gamma_{wb}$, and $\beta_{wb}$ are readjustment gains (parameters). AVR(R), AVR(G), and AVR(B) are average signal levels of the respective colors of the reference pixels. Further, MIN(R, G, B) is a minimum value of the average signal levels (AVR(R), AVR(G), AVR(B)) of each color.

The calculation of the readjustment gain will be described using a specific example. For example, it is assumed that an average signal level of a plurality of reference pixels in an adjustment region is (R, G, B)=(200, 210, 205). In this case, a minimum value of the average signal level is 200. Therefore, a readjustment gain is ($\alpha_{wb}$, $\gamma_{wb}$, $\beta_{wb}$)=(200/200, 200/210, 200/205)=(1, 0.95, 0.98). The equation 7 is an example, and for example, the denominator may be changed from the average signal level of each color of the reference pixels to a maximum value (210 in the case of the above specific example) and the numerator may be changed from the minimum value to the average signal level of each color of the reference pixels.

After calculating a readjustment gain, the readjustment unit 104 performs readjustment processing on image data using the calculated readjustment gain. If the reference pixels do not occupy 5% or more of the pixels in the adjustment region, the processing is performed using a surrounding readjustment gain.

When there is a plurality of adjacent gains which is readjustment gains of adjacent adjustment regions, the readjustment unit 104 may calculate an average value of the plurality of adjacent gains and use the average value as a readjustment gain for the color balance of the adjustment region which to be processed.

If the reference pixels do not occupy more than a preset number of pixels in the adjustment region, the readjustment unit 104 enlarges a size of the adjustment region by several percent (e.g., 3 percent, 10 percent, 30 percent, etc.), and calculates a readjustment gain using the enlarged adjustment region. If the reference pixels do not exist more than the preset number of pixels in the enlarged adjustment region, the processing of enlarging the adjustment region by a few percent is repeated.

After performing readjustment processing on image data in this manner, the readjustment unit 104 supplies the image data subjected to the readjustment processing to the geometric transformation unit 105. Then, the geometric transformation unit 105 performs geometric transformation processing on the received image data (step S17).

Figure 16:
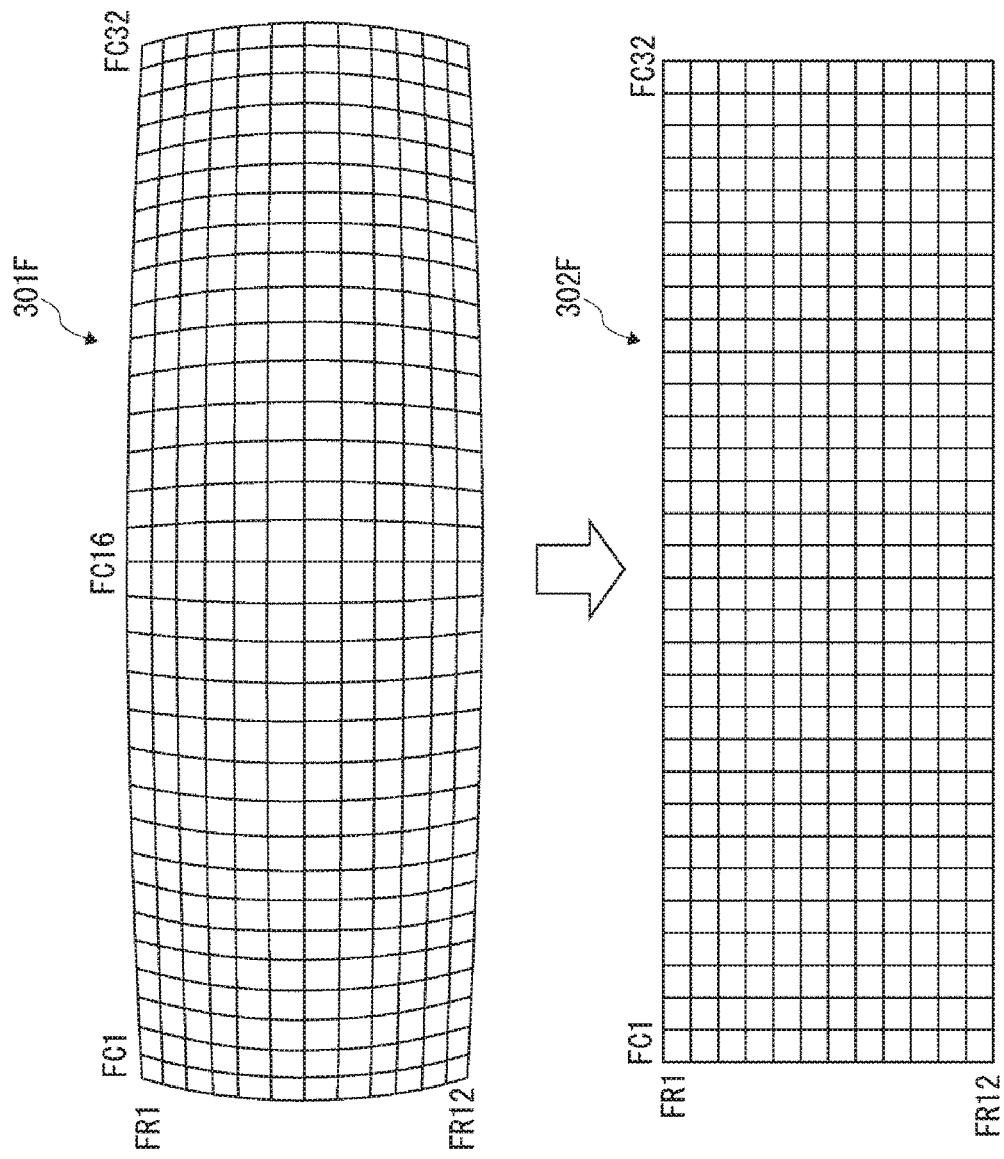
FIG. 16 is a diagram showing an example of performing geometric transformation processing on an image according to the first embodiment.
Figure 17:
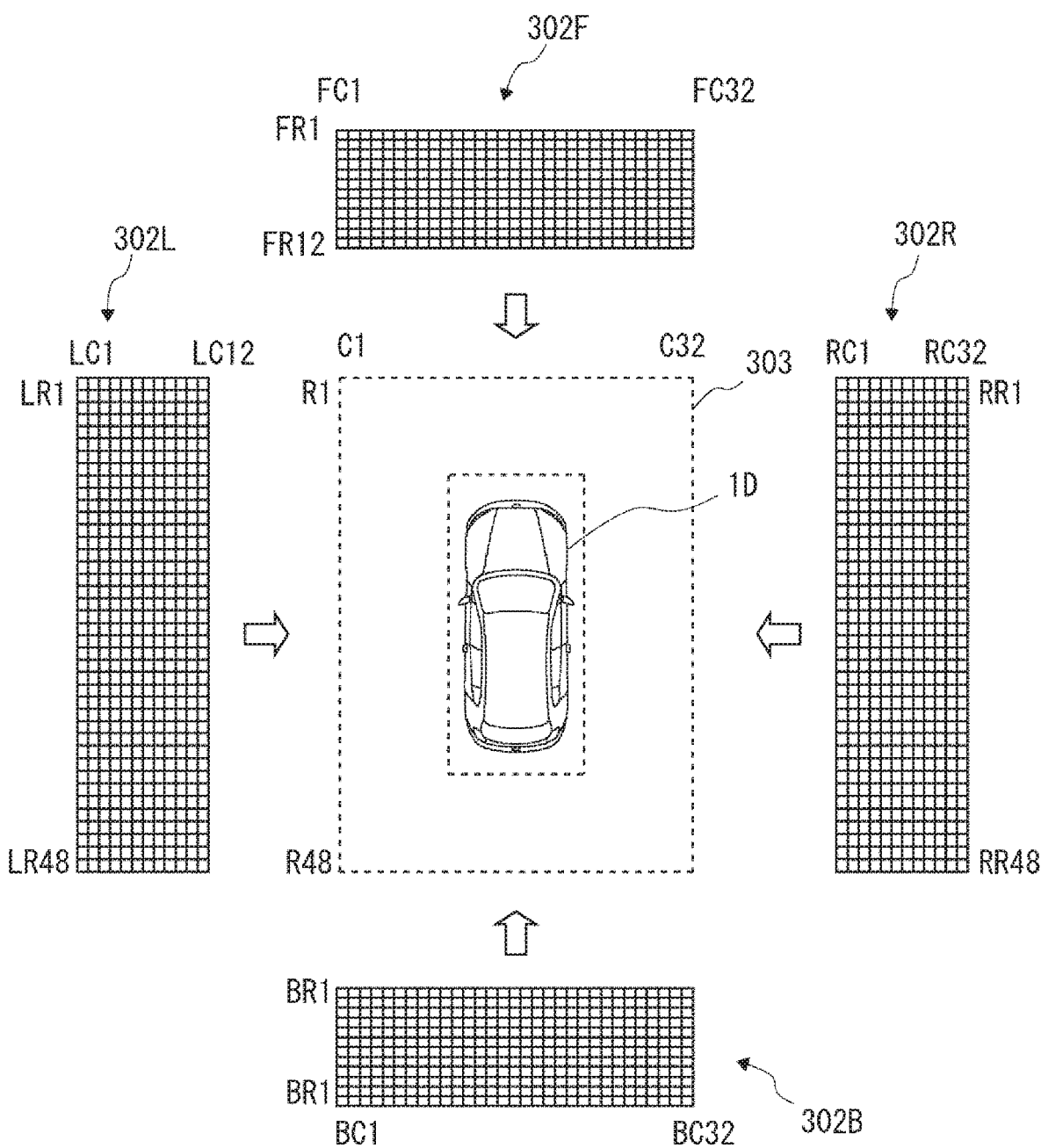
FIG. 17 is a diagram schematically showing an example of performing processing for synthesizing images according to the first embodiment.

FIG. 16 is a diagram showing an example of performing geometric transformation processing on an image according to the first embodiment. A barrel-shaped image shown in the upper side of the drawing is the image data 301F subjected to readjustment processing. The geometric transformation unit 105 performs geometric transformation processing on the image data 301F. As a result, the image data 301F is transformed into rectangular image data 302F by eliminating a barrel-shaped distortion caused by influence of aberration of a wide-angle lens. The geometric transformation unit 105 performs such processing on each of the image data 301F, 301L, 301B, and 301R obtained from the four cameras mounted on the automobile 1 and subjected to the processing described above. As a result, the image data acquired from the four cameras are transformed into rectangular images.

In the description of the present embodiment, the example of correcting a barrel-shaped distortion by performing geometric transformation processing on barrel-shaped image data has been shown, but in addition to the processing of correcting the barrel-shaped distortion, the image data may be subjected to linear transformation processing such as trapezoidal correction. When capturing an image of the periphery of the automobile 1 from the cameras mounted on the automobile 1 and generating an image to be subjected to viewpoint conversion processing called surround view from the captured image, the semiconductor device 100 performs such viewpoint conversion processing, and performs the above-described linear transformation along with this processing.

Next, the geometric transformation unit 105 performs the geometric transformation processing described above, and then supplies the image data to the image synthesis unit 106. Then, the image synthesis unit 106 performs processing for synthesizing the received image data (step S18). FIG. 13 is a diagram schematically showing an example of performing processing for synthesizing images according to the first embodiment. On the upper side of the drawing, image data 302F transformed into a rectangular image by the geometric transformation unit 105 is shown. Similarly, image data 302L, image data 302B, and image data 302R are shown on the left side, the lower side, and the right side of the drawing, respectively. Synthesized image data 303 is shown in a portion surrounded by these four image data.

The synthesized image data 303 is configured to superimpose the overlapping regions of the image data 302F, 302L, 302B, and 302R. For example, the processing region (FC1, FR1) of the image data 302F corresponds to the processing region (LC1, LR1) of the image data 302L. Therefore, in the synthesized image data 303, the processing region (FC1, FR1) of the image data 302F and the processing region (LC1, LR1) of the image data 302L are superimposed.

Further, a size of the synthesized image data 303 in the horizontal direction is configured to coincide with a size of the image data 302F in the horizontal direction and a size of the image data 302B in the horizontal direction. A size of the synthesized image data 303 in the vertical direction is configured to coincide with a size of the image data 302L in the vertical direction and a size of the image data 302R in the vertical direction. Therefore, in the synthesized image data 303, C1 to C32 are shown in the horizontal direction, and R1 to R48 are shown in the vertical direction.

Furthermore, in the synthesized image data 303 generated from these four image data, image data does not exist in the center portion. Therefore, the semiconductor device 100 superimposes image data 1D of a dummy automobile stored in advance on the synthesized image data 303. As a result, the synthesized image data 303 generates an image in which a driver looks at an automobile he/she drives from above the automobile. In such a system, displaying an image with a suitable color balance so that a driver can easily recognize objects may contribute to improving safety of an automobile and environment surrounding the automobile.

Before the image data 302F, 302L, 302B, and 3021R are received by the image synthesis unit 106, effects of initial color adjustment processing performed by the ISPs on the image data 302F, 302L, 302B, and 3021R are canceled, and color balance of the image data is readjusted by readjustment gains. Therefore, even if the processing regions having such a correspondence relationship are superimposed, the synthesized image data 303 as a whole can maintain a suitable color balance.

In addition, when the processing regions having such a correspondence relationship are superimposed, there is a case where signal levels of each of R, G, and B of pixels included in the two processing region having the correspondence relationship completely do not coincide and are different from each other. In such a case, an average value of the signal levels of each of R, G, and B of the pixels included in the two processing region is adopted. According to the present embodiment, even when the average value is adopted in this manner, since the difference between the signal levels of each of R, G, and B of the pixels included in the two processing region is reduced by the above-described processing, it is possible to generate synthesized image data subjected to color balance processing suitable for a driver or the like.

The image synthesis unit 106 supplies the synthesized image data 303 generated in this way to the output unit 107. Then, the output unit 107 outputs the received synthesized image data 303 to the outside (display device 12) (step S19).

Next, the semiconductor device 100 determines whether to terminate the processing (step S20). If it is not determined that the processing is to be terminated (No in step S20), the semiconductor device 100 returns to the step S10 and repeats the processing. On the other hand, if it is determined that the processing is to be terminated (Yes in step S20), the semiconductor device 100 terminates the processing.

The semiconductor device 100 adjusts color balance of image data by the series of processing described above. When the camera 11F, the camera 11L, the camera 11B, and the camera 11R do not perform the AWB processing, the processing from the steps S12 to S14 and the processing of the step S21 described above can be omitted. In this case, the estimation source image generation unit 102 shown in FIG. 3 is not included in the semiconductor device 100.

In the series of processing described above, the step of performing geometric transformation processing on image data (step S17) may be performed after the step S11 is performed. In this case, the step of synthesizing the image data (step S18) may be performed before the adjustment region determination processing (step S15) is performed.

Figure 18:
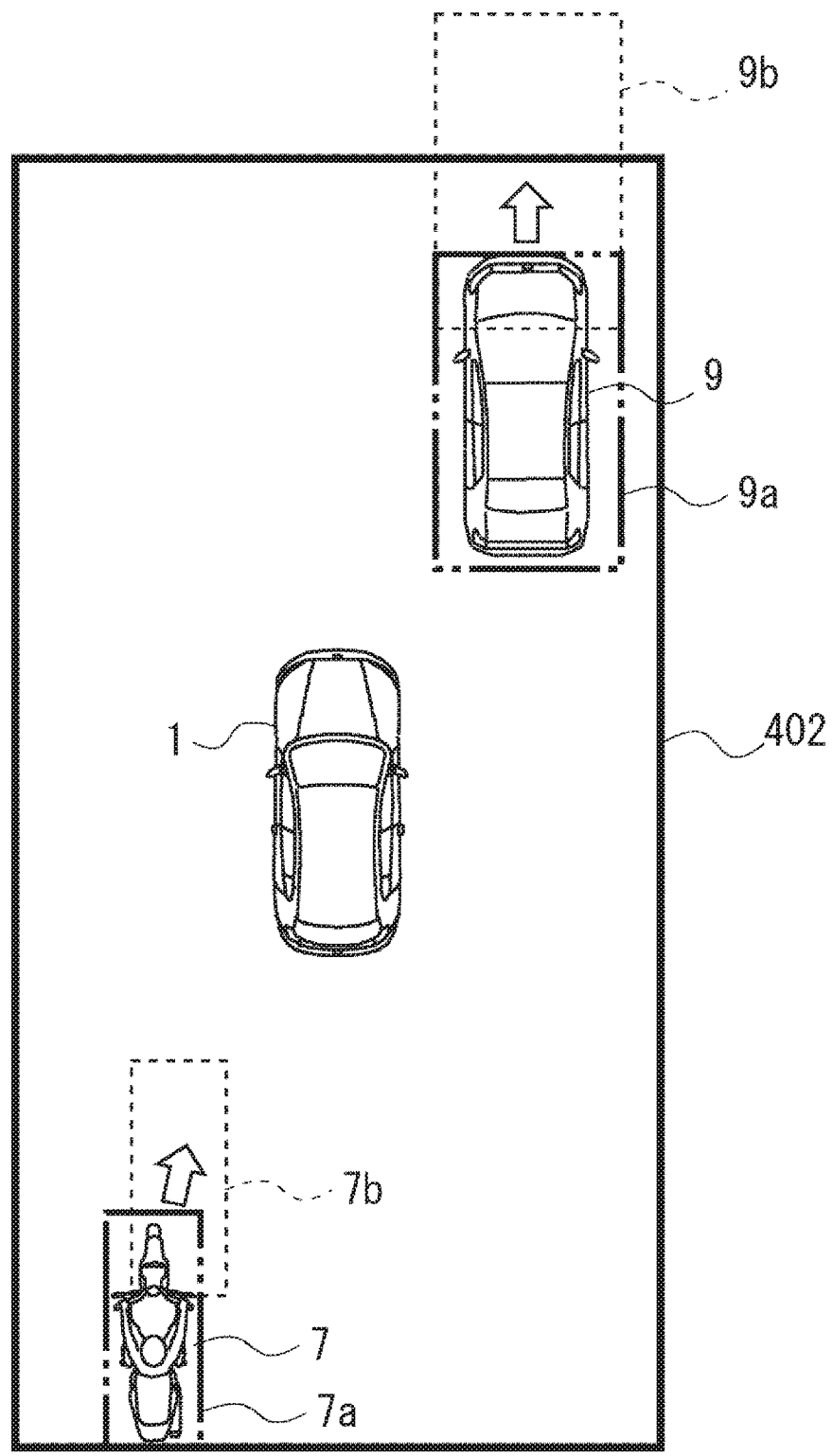
FIG. 18 is a diagram showing an example of a situation in which a priority level of a target object changes.

Next, processing performed when a priority level of a target object changes will be described with reference to FIG. 18. FIG. 18 is a diagram showing an example of a situation in which a priority level of a target object changes. In the drawing, the other automobile 9 and a motorcycle 7 which are target objects are present in the display region 402 of the automobile 1. Further, the drawing shows a situation at a time t=N+2. At the time t=N+2, the other automobile 9 is positioned at a region 9a, and the motorcycle 7 is positioned at a region 7a. That is, at the time t=N+2, since a distance between the automobile 1 and the other automobile 9 is shorter than a distance between the automobile 1 and the motorcycle 7, the first target object is the other automobile 9, and the second target object is the motorcycle 7.

In such a situation, the adjustment region determination unit 103 determines, by performing the processing shown in FIG. 14, the priority levels of the target objects at a time t=N+3, which is a time after the time t=N+2. The position of the other automobile 9 at the time t=N+3 estimated by the adjustment region determination unit 103 is a region 9b. Similarly, the position of the motorcycle 7 estimated by the adjustment region determination unit 103 is a region 7b. A distance between the automobile 1 and the region 7b is shorter than a distance between the automobile 1 and the region 9b. Therefore, the adjustment region determination unit 103 determines the first target object at the time t=N+3 as the motorcycle 7, and determines the second target object at the time t=N+3 as the other automobile 9. That is, the priority levels of the target objects change from the time t=N+2 to the time t=N+3. Therefore, the adjustment region determination unit 103 changes the first adjustment region from the region 9b to the region 7b.

Figure 19:
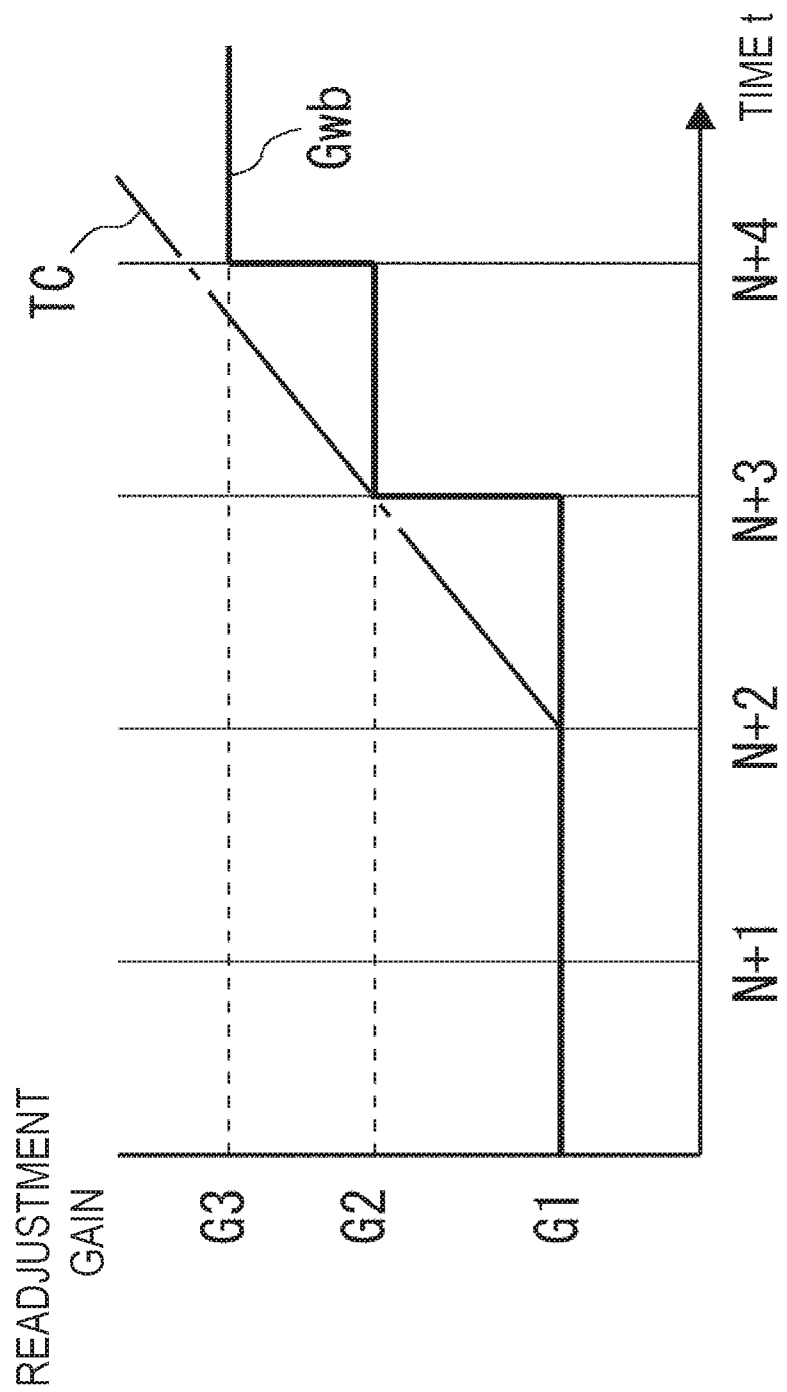
FIG. 19 is a graph for explaining an example of a readjustment gain calculated by a readjustment unit.
Figure 20:
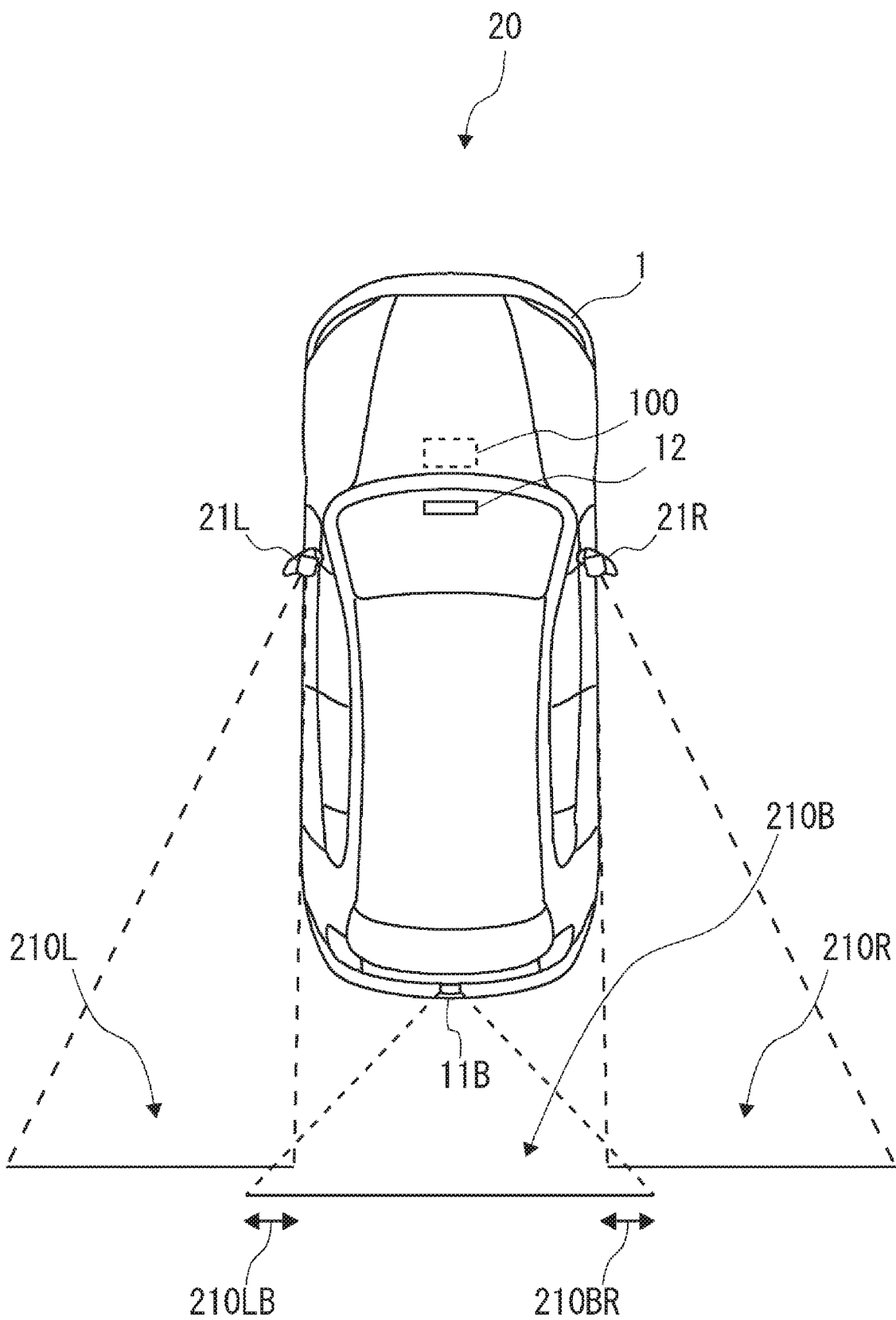
FIG. 20 is an overview of an automobile according to a modification of first embodiment.

Next, an example of a readjustment gain calculated by the readjustment unit 104 in the above-described situation will be described with reference to FIG. 19. FIG. 19 is a graph for explaining an example of the readjustment gain calculated by the readjustment unit 104. In the graph shown in the drawing, the horizontal axis represents time, and the vertical axis represents magnitude of a readjustment gain. A thick polygonal line Gwb plotted on the graph represents a value of a readjustment gain. Although one gain is described here as an example, gains of image data actually exist separately for each of R, G, and B.

At the time t=N+1 and the time t=N+2, the readjustment unit 104 calculates a readjustment gain G1 based on the first adjustment region determined from the estimated position of the other automobile 9, which is the first target object. Then, at the time t=N+3, the position of the first adjustment region is largely changed by the first target object being changed from the other automobile 9 to the motorcycle 7. The readjustment unit 104 calculates a readjustment G3 based on the largely changed first adjustment region. In such a case, when a difference between the readjustment gain G1 and the readjustment gain G3 is large, the color balance of the image data changes abruptly, and the driver may find it difficult to see the image data. In present embodiment, the readjustment unit 104 adjusts the readjustment gain using a preset time constant TC in order to suppress a sudden change in color balance of an image in such a case. In the drawing, a straight line indicated by a dashed line is a line drawn by plotting the time constant TC. At the time t=N+3, the readjustment unit 104 calculates a readjustment gain G2 which is a value not exceeding the time constant TC, and performs the readjustment processing on the image data using the readjustment gain G2. Then, at a time t=N+4, the readjustment unit 104 performs the readjustment processing on the image data using the readjustment gain G3 not exceeding the time constant TC.

In this manner, when determining a readjustment gain at a predetermined time, the readjustment unit 104 determines the readjustment gain so that a rate of change from the readjustment gain determined in the past (referred to as a past gain) does not exceed a preset value. With such a configuration, the semiconductor device 100 can suppress a sudden change in color balance of an image, and can prevent deterioration in visibility due to the sudden change in the color balance of the image.

Although the first embodiment has been described above, the configuration according to the first embodiment is not limited to the configuration described above. For example, the four cameras shown in FIG. 1 may be installed in the left front portion, left rear portion, right front portion, and right rear portion of the automobile 1. Alternatively, these four cameras may be installed in the roof of the automobile 1 so that the periphery of the automobile 1 is in an imaging range. The number of cameras is not limited to four. Further, the camera may be movable, and may be configured to sequentially capture images around the automobile while moving.

The readjustment unit 104 may be configured to use, as a readjustment region, an average value obtained by averaging a readjustment gain calculated from a first adjustment region and a readjustment gain calculated from a second adjustment region. In this case, the readjustment unit 104 may weight the average value. With such a configuration, the image processing system 10 can suppress deterioration of color balance of an image of a plurality of target objects.

According to the above-described configuration, the semiconductor device 100 or the image processing system 10 performs color balance processing suitable for images of objects around the automobile 1. As a result, the driver or the like of the automobile 1 can easily recognize the objects around the automobile 1. That is, according to the first embodiment, it is possible to provide a semiconductor device or the like for improving visibility of an object.

First Modification of First Embodiment

Next, a first modification of the first embodiment will be described. FIG. 14 is an overview of an automobile according to the first modification of the first embodiment. An image processing system 20 according to the first modification of the first embodiment differs from the image processing system 10 according to the first embodiment in that the number of cameras and arrangement of the cameras.

The image processing system 20 according to the first modification of the first embodiment is a system for capturing an image of the rear side of the automobile 1, performing predetermined processing on image data of the captured image, and displaying the processed image data to the driver or the like. The image processing system 20 may be installed in place of a side mirror and a rearview mirror of an automobile. The image processing system 20 includes a camera 21L, the camera 11B, a camera 21R, the display device 12, and the semiconductor device 100 as a main configuration of the image processing system 20.

The camera 21L captures an image of an image capturing region 210L on the rear left side of the automobile 1, the camera 11B captures an image of an image capturing region 210B in the center of the rear side of the automobile 1, and the camera 21R captures an image of an image capturing region 210R on the rear right side of the automobile 1. In these image capturing regions, the image capturing regions adjacent to each other include overlapping regions which are regions where the image capturing regions overlap. That is, the image capturing region 210L and the image capturing region 210B each have an overlapping region 210LB where the image capturing region 210L and the image capturing region 210B overlap. Similarly, the image capturing region 210B and the image capturing region 210R each have an overlapping region 210BR where the image capturing region 210B and the image capturing region 210R overlap.

In such a configuration, the semiconductor device 100 generates estimation source image data by canceling effects of initial color adjustment processing performed by the ISPs on image data. Then, the semiconductor device 100 detects a target object from the estimation source image data, estimates a position after elapse of a predetermined time of the target object, determines an adjustment region, and performs color balance readjustment processing on the image data using the determined adjustment region. Further, the semiconductor device 100 synthesizes the image data so that the overlapping regions overlap with each other to generate a synthesized image. Further, the semiconductor device 100 outputs the readjusted synthesized image data to the display device 12.

With the above-described configuration, the driver can recognize the rear side of the automobile 1 by an image subjected to a suitable color balance processing. Therefore, the first modification of the first embodiment can provide a semiconductor device or the like for performing color balance processing suitable for the image.

Second Modification of First Embodiment

Figure 21:
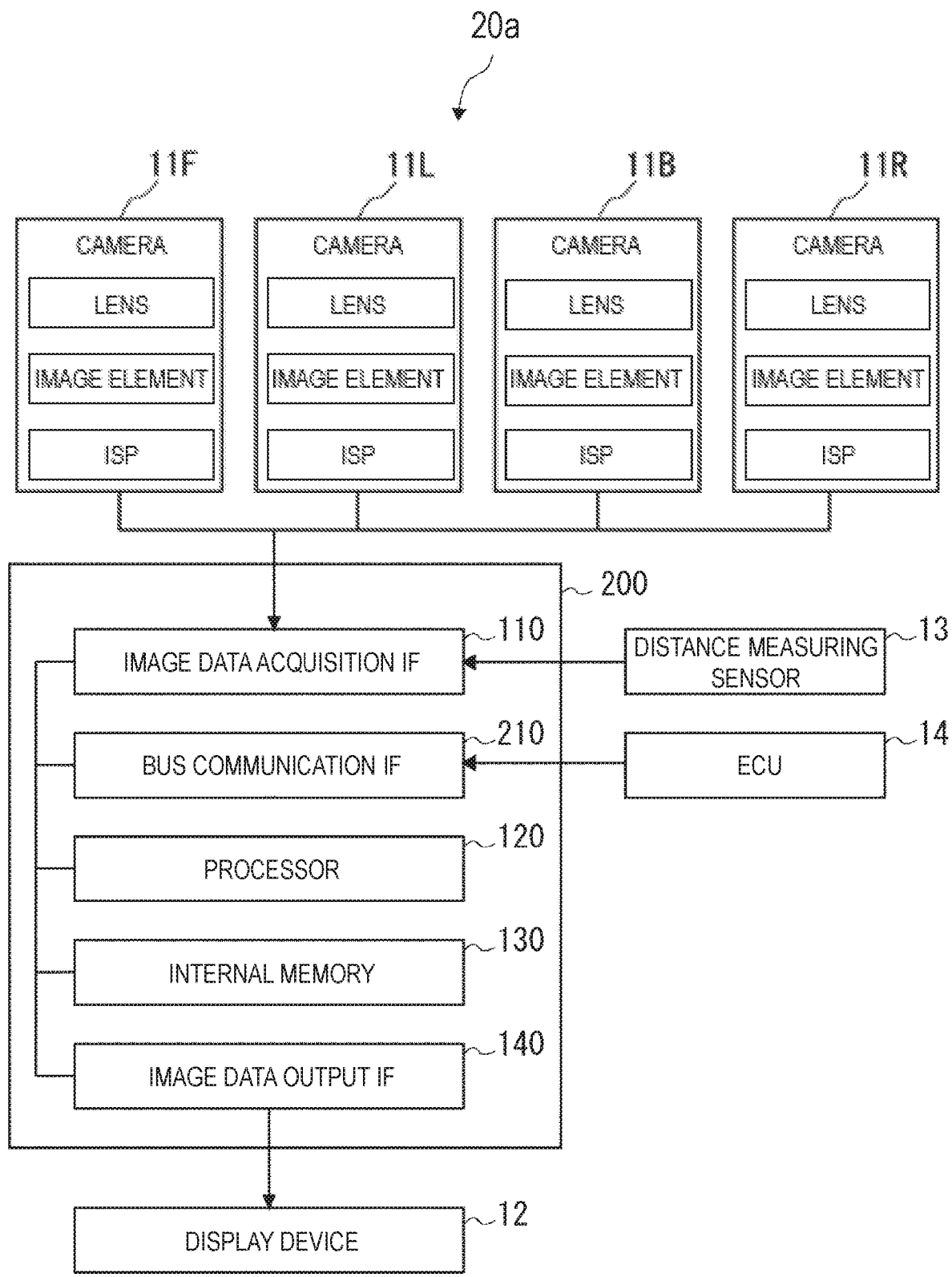
FIG. 21 is a schematic configuration diagram of an image processing system according to a second modification of the first embodiment.

Next, a second modification of the first embodiment will be described. FIG. 21 is a schematic configuration diagram of an image processing system 20a according to a second modification of the first embodiment. The image processing systems 20a according to the second modification of the first embodiment differs from the image processing system 10 according to the first embodiment in that the image processing system 20 includes a semiconductor device 200 instead of the semiconductor device 100. In addition, the image processing system 20a according to the second modification of the first embodiment differs from the image processing system 10 according to the first embodiment in that the image processing system 20 includes a distance measuring sensor 13 and an Electronic Control Unit (ECU) 14. Hereinafter, differences between the second modification of the first embodiment and the first embodiment will be described.

The distance measuring sensor 13 is a sensor device for detecting a position, shape, and size of an object existing around the automobile 1. The distance measuring sensor 13 is, for example, a distance measuring sensor using a laser beam called Laser Imaging Detection and Ranging (LIDAR) or a sensor device that generates thermal images using infrared light. The distance measuring sensor 13 generates image data for detecting an object using light differing from visible light in this manner, and supplies the generated image data to the semiconductor device 200.

The ECU 14 acquires information related to driving of the automobile 1 from a driving device, a steering device, and the like incorporated in the automobile 1. The information acquired by the ECU 14 is, for example, a speed of the automobile 1, a steering angle of the steering device, GPS position information, and the like. The ECU 14 supplies the acquired information to the semiconductor device 200.

The image data acquisition IF 110 of the semiconductor device 200 receives image data supplied by the distance measuring sensor 13 in addition to image data supplied by the camera 11F, camera 11L, camera 11B, and camera 11R related to the first embodiment.

The semiconductor device 200 has a bus communication IF 210. The bus communication IF 210 is a communication interface for performing communication with an external device, and may be a wired interface or a wireless interface. The communication interface conforms to standards such as Universal Serial Bus (USB), High-Definition Multimedia Interface (HDMI), or Controller Area Network (CAN). The bus communication IF 210 is connected to the ECU 14, and receives information supplied from the ECU 14. The information supplied from the ECU 14 is supplied to the processor 120. The processor 120 performs processing on the information.

With such a configuration, the image processing system 20a can recognize, by the distance measuring sensor 13, target objects in a range different from the ranges of image capturing regions of the camera 11F, the camera 11L, the camera 11B, and the camera 11R. Preferably, the distance measuring sensor 13 detects a target object located in a region outside a region included in a synthesized image. As a result, it is possible to detect in advance a target object that is estimated to enter the display region of the synthesized image, and to perform color balance adjustment processing suitable for the target object that enters the display region. In addition, the image processing system 20a can more accurately estimate the position of the target object by acquiring information about driving of the automobile 1.

Second Embodiment

Next, a second embodiment will be described. An image processing system 30 according to the second embodiment differs from the image processing system 10 according to the first embodiment in that the first object can be selected. In order to realize such a function, the image processing system 30 according to the second embodiment is configured to superimpose an image displayed on the display device 12 on a touch sensor. Hereinafter, differences between the second embodiment and the first embodiment will be described.

Figure 22:
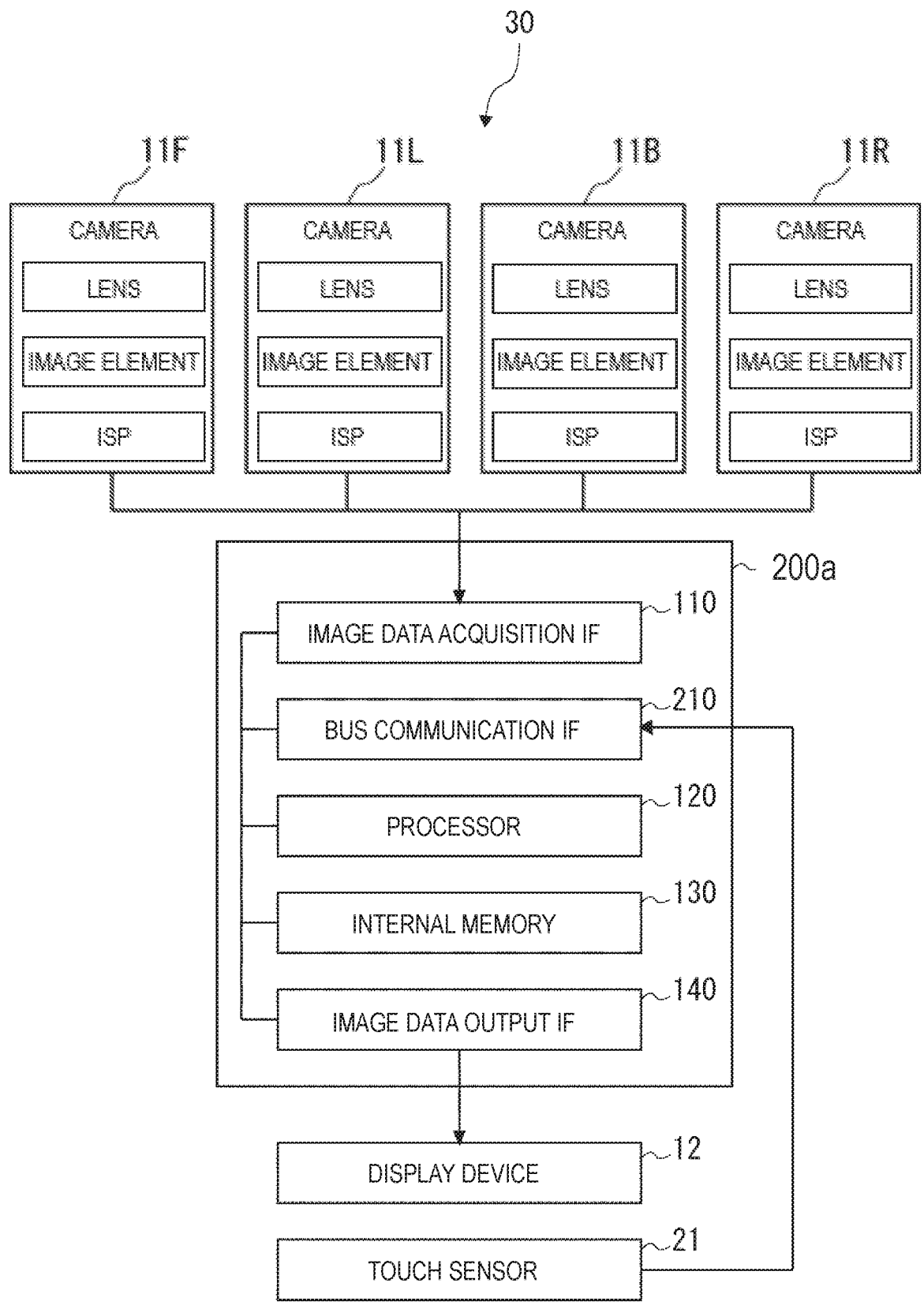
FIG. 22 is a schematic configuration diagram of an image processing system according to a second embodiment.

FIG. 22 is a schematic configuration diagram of an image processing system 30 according to a second embodiment. The image processing system 30 includes the semiconductor device 200a instead of the semiconductor device 100. In addition, the image processing system 30 includes a touch sensor 21 connected to the semiconductor device 200a.

The semiconductor device 200a includes the bus communication IF 210. The bus communication IF 210 is connected to the touch sensor 21 and receives signals supplied from the touch sensor 21. The signals received by the bus communication IF 210 are provided to the processor 120. The processor 120 performs processing of the signals.

The touch sensor 21 is a sensor device for detecting a touched position when a driver or the like touches a predetermined position in a display section of the display device 12, and is, for example, a position detecting sensor of a pressure-type, a capacitance-type, or an optical-type. The touch sensor 21 is disposed on the display section of the display device 12 so as to detect a position associated with coordinates of image data displayed on the display section.

Figure 23:
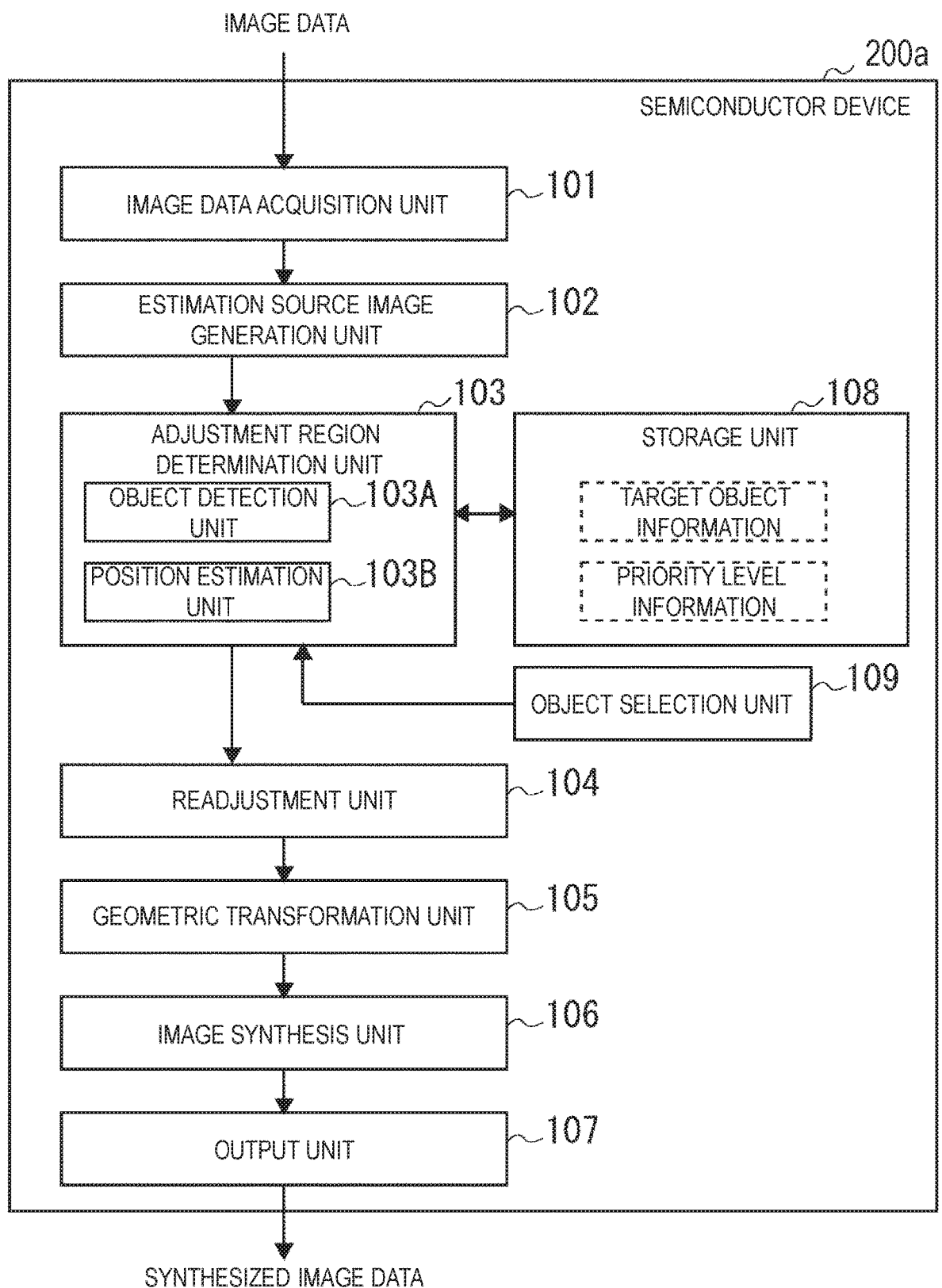
FIG. 23 is a functional block diagram of a semiconductor device according to the second embodiment.

FIG. 23 is a functional block diagram of a semiconductor device 200a according to the second embodiment. The functional blocks of the semiconductor device 200a according to the second embodiment differ from those of the semiconductor device 100 according to the first embodiment in that the semiconductor device 200a includes an object selection unit 109.

The object selection unit 109 operates based on a signal supplied from the touch sensor 21. The object selection unit 109 receives a signal from the touch sensor 21, and detects coordinate information of image data based the received signal. Then, the object selection unit 109 supplies the detected coordinate information of the image data to the adjustment region determination unit 103.

The adjustment region determination unit 103 determines whether or not the coordinate information of the image data received from the object selection unit 109 coincides with a position where a target object exists. Then, when determining that the coordinate information coincides with the position where the target object exists, the adjustment region determination unit 103 treats the priority level of the coincided target object as the first priority.

A function of the object selection unit 109 will be described with reference to FIG. 24. FIG. 24 is a flowchart showing an example of object selection processing in the semiconductor device 200a according to the second embodiment. The flowchart shown in the drawing is performed in parallel with the processing shown in FIG. 14.

First, the object selection unit 109 determines whether or not a touch signal is detected (step S250). When it is not determined that the touch signal is detected (No in step S250), the object selection unit 109 performs a polling operation to repeatedly determine whether the touch signal is detected or not.

When it is determined that the touch signal is detected (Yes in step S250), the object selection unit 109 supplies coordinate information included in the touch signal to the adjustment region determination unit 103. The adjustment region determination unit 103 determines whether or not the received coordinate information coincides with a position where a target object exists (step S251).

When it is determined that the coordinate information does not coincide with the position where the target object exists (No in step S251), the adjustment region determination unit 103 determines the region related to the coordinate information as an adjustment region (step S256). In this case, the adjustment region determination unit 103 treats the coordinates received from the object selection unit 109 as a region designated by the driver or the like. Therefore, a region including the selected coordinates regardless of the position of the detected target object is determined as the adjustment region.

When it is determined that the coordinate information coincides with the position where the target object exists (Yes in step S251), the adjustment region determination unit 103 treats the coincided target object as an object selected by the driver or the like. That is, the adjustment region determination unit 103 determines the selected target object as a first target object (step S252). Such processing is performed with a higher priority, as compared with the processing shown in FIG. 14. Therefore, the adjustment region determination unit 103 determines whether or not the first target object is to be changed (step S253).

Here, when the coordinates touched by the driver or the like coincides with the position of the first target object determined by the adjustment region determination unit 103, the adjustment region determination unit 103 does not determine that the first target object is to be changed (No in step S253). In this case, the adjustment region determination unit 103 determines an adjustment region in accordance with the processing performed so far (step S255), and ends the series of processing.

On the other hand, when the coordinates touched by the driver or the like does not coincide with the position of the first target object determined by the adjustment region determination unit 103, the adjustment region determination unit 103 determines that the first target object is to be changed (Yes in step S253). In this case, the adjustment region determination unit 103 treats the selected target object as the first target object, and determines the target object that has been treated as the first target object until then as s second target object (step S254). That is, the adjustment region determination unit 103 changes the priority level of the target object, which has been treated as the first priority, to the second priority. Then, the adjustment region determination unit 103 determines an adjustment region based on the first target object and the second target object determined in this manner (step S255), and ends the series of processing.

Although the second embodiment has been described above, the configuration of the second embodiment is not limited to that described above. For example, the image processing system 30 may include an operation means for issuing a command instructing to move a region to be selected in the up-down-left-right direction and select the moved region, instead of the touch sensor 21 for selecting a region. In addition, the step S256 may be omitted, and when a region not including a target object is selected, an instruction from the object selection unit 109 may not be reflected in the processing performed by the adjustment region determination unit 103.

With the above-described configuration, the image processing system 30 performs color balance adjustment processing suitable for an object that a driver desires to gaze at. As a result, the driver or the like of the automobile 1 can easily recognize objects around the automobile 1. That is, according to the second embodiment, it is possible to provide a semiconductor device or the like for improving visibility of an object.

Also, the programs described above may be stored and provided to a computer using various types of non-transitory computer readable media. Non-transitory computer readable media includes various types of tangible storage media. Examples of non-transitory computer readable media include magnetic recording media (e.g., flexible disks, magnetic tapes, hard disk drives), magneto-optical recording media (e.g., magneto-optical disks), a Compact Disc Read Only Memory (CD-ROM), a Compact Disc Recordable (CD-R), a Compact Disc Rewritable (CD-R/W), and a semiconductor memory (e.g., masked Read Only Memory (ROM), Programmable ROM (PROM), Erasable PROM (EPROM), flash ROM, Random Access Memory (RAM)). In addition, the program may also be supplied to a computer by various types of transitory computer readable media. Examples of transitory computer readable media include electrical signals, optical signals, and electromagnetic waves. The transitory computer readable medium may provide the program to a computer via wired communication paths such as electrical wires and optical fibers, or wireless communication paths.

Although the invention made by the present inventors has been specifically described based on the embodiments, it is needless to say that the present invention is not limited to the above-described embodiments, and various changes may be made without departing from the scope thereof.

What is claimed is:

1. A semiconductor device comprising:
an image data acquisition circuit configured to acquire, at a first time and a second time that is a time after the first time respectively, a plurality of captured image data obtained by capturing a plurality of images, the plurality of captured image data obtained at the first time being a plurality of first captured image data, the plurality of captured image data obtained at the second time being a plurality of second captured image data, each image including an overlapping region in an image capturing region, the overlapping region being a region where the image capturing regions of the images overlap each other;
an adjustment region determination circuit configured to detect, from the plurality of first captured image data, a target object that is an object set to be recognized in advance, and determine an adjustment region by estimating a position of the target object at the second time based on a change in a position of the target object from a time before the first time to the first time;
a color adjustment circuit configured to determine a color adjustment gain based on the adjustment region of the plurality of first captured image data, and perform color balance adjustment processing on the plurality of second captured image data based on the color adjustment gain; and
an image synthesis circuit configured to synthesize the plurality of second captured image data so that the overlapping regions included in the plurality of images of the plurality of second captured image data overlap each other to generate image data of a synthesized image.

2. The semiconductor device according to claim 1, further comprising an output circuit configured to output the image data of the synthesized image.

3. The semiconductor device according to claim 1,
wherein each captured image data is image data on which initial color adjustment processing has been performed,
wherein the semiconductor device further comprises an estimation source image generation circuit configured to cancel effects of the initial color adjustment processing of the plurality of first captured image data and the plurality of second captured image data to generate a plurality of first estimation source image data and a plurality of second estimation source image data, and
wherein the color adjustment circuit is configured to determine the color adjustment gain using the plurality of first estimation source image data as the plurality of first captured image data.

4. The semiconductor device according to claim 3, wherein the estimation source image generation circuit is configured to:
calculate, for each first captured image data, a first matching gain for matching signal levels of pixels in a region having a correspondence relationship with each other in the overlapping region of the image of the first captured image data;
generate the first estimation source image data by multiplying the first matching gain by signal levels of pixels included in the corresponding first captured image data;
calculate, for each second captured image data, a second matching gain for matching signal levels of pixels in a region having a correspondence relationship with each other in the overlapping region of the image of the second captured image data; and
generate the second estimation source image data by multiplying the second matching gain by signal levels of pixels included in the corresponding second captured image data.

5. The semiconductor device according to claim 4, wherein the estimation source image generation circuit is configured to calculate the first and second matching gains based on an average value of the signal levels of the pixels in the region having the correspondence relationship.

6. The semiconductor device according to claim 3, wherein the estimation source image generation circuit is configured to:
generate, based on information on the initial color adjustment processing included in each first captured image data, the first estimation source image data; and
generate, based on information on the initial color adjustment processing included in each second captured image data, the second estimation source image data.

7. The semiconductor device according to claim 1, wherein the adjustment region determination circuit is configured to determine a preset region as the adjustment region when the adjustment region determination circuit is not able to detect the target object from the plurality of first captured image data.

8. The semiconductor device according to claim 1, wherein the color adjustment circuit is configured to determine the color adjustment gain so that a rate of change from the adjustment gain determined in the past does not exceed a preset value.

9. The semiconductor device according to claim 1, wherein, when the adjustment region determination circuit detects a plurality of target objects in the first captured image data, the adjustment region determination circuit is configured to detect a first target object having a highest priority based on a preset determination criterion, and determine the adjustment region by estimating the position of the first target object at the second time.

10. The semiconductor device according to claim 9, wherein the adjustment region determination circuit is configured to estimate a position of each of the plurality of target objects at the second time, and determine the first target object based on the estimated position of each of the plurality of target objects at the second time.

11. The semiconductor device according to claim 9, further comprising a storage unit configured to store priority level information in which an attribute of the target object and a priority level are associated with each other, and
wherein the adjustment region determination circuit is configured to detect the first target object based on the priority level information.

12. The semiconductor device according to claim 9, wherein the adjustment region determination circuit is configured to:
detect a second target object having a second highest priority;
determine a first adjustment region by estimating the position of the first target object at the second time; and
determine a second adjustment region by estimating a position of the second target object at the second time.

13. The semiconductor device according to claim 1, further comprising an object selection circuit configured to receive a signal for selecting the target object, and detect coordinates information about the target object to be selected based on the signal, and
wherein the adjustment region determination circuit is configured to determine the adjustment region based on the coordinates detected by the object selection circuit.

14. The semiconductor device according to claim 1, wherein the adjustment region determination circuit is configured to detect the target object located in a region outside a region included in the synthesized image.

15. An image processing system comprising:
the semiconductor device according to claim 3;
a plurality of cameras configured to output the plurality of captured image data; and
a display device configured to receive the image data of the synthesized image.

16. The image processing system according to claim 15, wherein each camera comprises an image signal processor, and
wherein the image signal processor is configured to perform the initial color adjustment processing on the captured image data.

17. The image processing system according to claim 15, wherein the plurality of cameras is configured to capture images of scenery around a moving object to generate the plurality of captured image data, and
wherein the synthesized image is a two-dimensional image of a 360-degree scenery around the moving object.

18. An image processing system comprising:
the semiconductor device according to claim 13;
a display device configured to receive the image data of the synthesized image; and
a touch sensor configured to be provided corresponding to a display section of the display device, and output the signal to the object selection circuit.

19. An image processing method comprising:
acquiring, at a first time and a second time that is a time after the first time respectively, a plurality of captured image data obtained by capturing a plurality of images, the plurality of captured image data obtained at the first time being a plurality of first captured image data, the plurality of captured image data obtained at the second time being a plurality of second captured image data, each image including an overlapping region in an image capturing region, the overlapping region being a region where the image capturing regions of the images overlap each other;
detecting, from the plurality of first captured image data, a target object that is an object set to be recognized in advance;
determining an adjustment region by estimating a position of the target object at the second time based on a change in a position of the target object from a time before the first time to the first time;
determining a color adjustment gain based on the adjustment region of the plurality of first captured image data;
performing color balance adjustment processing on the plurality of second captured image data based on the color adjustment gain; and
synthesizing the plurality of second captured image data so that the overlapping regions included in the plurality of images of the plurality of second captured image data overlap each other to generate image data of a synthesized image.

20. A non-transitory computer readable storage medium which stores a program for causing a computer to perform a method comprising:
acquiring, at a first time and a second time that is a time after the first time respectively, a plurality of captured image data obtained by capturing a plurality of images, the plurality of captured image data obtained at the first time being a plurality of first captured image data, the plurality of captured image data obtained at the second time being a plurality of second captured image data, each image including an overlapping region in an image capturing region, the overlapping region being a region where the image capturing regions of the images overlap each other;
detecting, from the plurality of first captured image data, a target object that is an object set to be recognized in advance;
determining an adjustment region by estimating a position of the target object at the second time based on a change in a position of the target object from a time before the first time to the first time;
determining a color adjustment gain based on the adjustment region of the plurality of first captured image data,
performing color balance adjustment processing on the plurality of second captured image data based on the color adjustment gain; and
synthesizing the plurality of second captured image data so that the overlapping regions included in the plurality of images of the plurality of second captured image data overlap each other to generate image data of a synthesized image.

* * * * *